(12) United States Patent
Makii

(10) Patent No.: US 7,714,893 B2
(45) Date of Patent: May 11, 2010

(54) IMAGE STABILIZATION MECHANISM AND IMAGE PICKUP APPARATUS

(75) Inventor: Tatsuo Makii, Tokyo (JP)

(73) Assignee: Sony Corporation, Tokyo (JP)

(*) Notice: Subject to any disclaimer, the term of this patent is extended or adjusted under 35 U.S.C. 154(b) by 449 days.

(21) Appl. No.: 11/835,656

(22) Filed: Aug. 8, 2007

(65) Prior Publication Data

US 2008/0055571 A1 Mar. 6, 2008

(30) Foreign Application Priority Data

Sep. 5, 2006 (JP) ............................. 2006-239993

(51) Int. Cl.
*H04N 5/228* (2006.01)
*G03B 17/00* (2006.01)
*G03B 3/10* (2006.01)
*G03B 13/34* (2006.01)

(52) U.S. Cl. .............................. 348/208.99; 348/208.4; 396/55

(58) Field of Classification Search .............. 348/208.4, 348/208.99, 340, 375, 208.2, 208.7–208.11; 396/52–55, 75, 133; 359/557, 811, 813, 359/554, 368
See application file for complete search history.

(56) References Cited

U.S. PATENT DOCUMENTS

| 5,266,988 | A | * | 11/1993 | Washisu | .................. | 396/55 |
| 5,541,693 | A | * | 7/1996 | Enomoto | .................. | 396/53 |
| 6,397,008 | B2 | * | 5/2002 | Kuwana et al. | ............... | 396/55 |
| 7,319,815 | B2 | * | 1/2008 | Seo | ............................. | 396/55 |
| 2006/0007320 | A1 | | 1/2006 | Seo | | |
| 2006/0120708 | A1 | | 6/2006 | Kosaka et al. | | |
| 2007/0236577 | A1 | * | 10/2007 | Ke et al. | ................ | 348/208.99 |
| 2009/0309982 | A1 | * | 12/2009 | Rouvinen et al. | ........ | 348/208.2 |

FOREIGN PATENT DOCUMENTS

| EP | 0 504 930 A1 | 9/1992 |
| JP | 3-188430 | 8/1991 |
| JP | 10-10597 | 1/1998 |
| JP | 2006-023664 | 1/2006 |
| JP | 2006-119579 | 5/2006 |
| JP | 2006-191249 | 7/2006 |

* cited by examiner

*Primary Examiner*—Tuan Ho
*Assistant Examiner*—Selam Gebriel
(74) *Attorney, Agent, or Firm*—Oblon, Spivak, McClelland, Maier & Neustadt, L.L.P.

(57) ABSTRACT

An image stabilization mechanism moves a movable lens or an imager in first and second directions perpendicular to each other and perpendicular to a light axis of the lens or an incident light axis of the imager. The mechanism includes a support member for supporting the movable lens or imager, a base member, a guide shaft secured to the base member and extending in the first direction, where the guide shaft is disposed in an elongate hole formed in the support member in a slidable manner in the first and second directions, an anti-rolling member fitted into the guide shaft in a slidable manner in its axis direction and engaged with the support member in a slidable manner in the second direction so as to prevent rolling of the support member about the light axis, and two drivers for moving the support member independently in the first and second directions.

32 Claims, 18 Drawing Sheets

IMAGE STABILIZATION MECHANISM AND IMAGE PICKUP APPARATUS

CROSS REFERENCES TO RELATED APPLICATIONS

The present invention contains subject matter related to Japanese Patent Application JP 2006-239993 filed in the Japanese Patent Office on Sep. 5, 2006, the entire contents of which are incorporated herein by reference.

BACKGROUND OF THE INVENTION

1. Field of the Invention

The present invention relates to an image stabilization mechanism and an image pickup apparatus and, in particular, to technology that produces a compact image stabilization mechanism capable of moving in a plane in two directions perpendicular to each other without rolling thereof and with a small number of components thereof.

2. Description of the Related Art

Some image pickup apparatuses (e.g., video cameras, still image cameras, or camera units incorporated in portable electronic devices, such as cell phones) include an image stabilization mechanism. The image stabilization mechanism compensates for image blurring caused by camera shake occurring when a shutter is released.

In general, an image stabilization mechanism employs one of the following three methods: a lens driving method, an image sensor driving method, and an electronic correction method. In a lens driving method, if an image is deviated in a direction perpendicular to a light axis due to the movement of the light axis caused by camera shake, a lens (or a lens group) of a lens system is temporarily moved in the direction perpendicular to the light axis so as to change the light path through the lens (hereinafter referred to as a "compensation lens"). In this way, the subject image is formed in an imaging plane at its proper position. In an image sensor driving method, an image sensor is moved so that the image forming position deviated from its proper position due to camera shake is moved back to the original position. In an electronic correction method, the image forming position deviated from its proper position due to camera shake is corrected through an electronic operation.

In the lens driving method and the image sensor driving method, a compensation lens or an image sensor needs to be moved in two directions perpendicular to the light axis. Accordingly, for example, an image stabilization mechanism described in Japanese Unexamined Patent Application Publication No. 3-188430 includes a stationary base member (a second holding frame 119) fixed to a camera body. The stationary base member supports a movable base (a first holding frame 16) in a movable manner in a first direction (a yaw direction) perpendicular to a light axis. The stationary base member further supports a first driving unit (a combination of a yaw coil 121, a yaw magnet 122, and a yaw yoke) for moving the movable base in the first direction. The movable base supports a movable frame (a lens holding frame 13) in a movable manner in a second direction (a pitch direction) perpendicular to the light axis and the first direction and a second driving unit (a combination of a pitch coil 18, a pitch magnet 19, and a pitch yoke 110) for moving the movable base in the second direction. The movable frame supports a compensation lens.

SUMMARY OF THE INVENTION

In the image stabilization mechanism described in Japanese Unexamined Patent Application Publication No. 3-188430, the movable frame that supports the compensation lens is supported by the movable base in a movable manner in the second direction. In addition, the movable base is supported by the base member in a movable manner in the first direction. Accordingly, the movable base is needed between the base member and the movable frame. Therefore, the number of components increases. It follows that the structure is complicated and the manufacturing cost is increased. In addition, it is difficult to reduce the size of the image stabilization mechanism. Furthermore, since the number of components increases, it is difficult to provide a high positional precision. As a result, mounting of a sensor (including position setting of the sensor) requires a large amount of time, and therefore, the manufacturing cost is further increased.

To reduce the number of components, only the movable frame that supports the compensation lens may be movable. This movable frame may be urged against the base member with three ball bearings therebetween. Accordingly, rolling of the three balls bearings allows the movable frame to move in the two directions perpendicular to the light axis. However, it is difficult to prevent rolling of the movable frame, that is, the rolling of the movable frame in a plane perpendicular to the light axis. Note that, in Japanese Unexamined Patent Application Publication No. 3-188430, guide shafts that extend in two directions perpendicular to each other are provided so as to prevent the rolling.

Accordingly, the present invention provides a simplified image stabilization mechanism having a small number of components and preventing a movable frame from rolling.

According to an embodiment of the present invention, an image stabilization mechanism for moving one of a movable lens and an image sensor in first and second directions perpendicular to one of a light axis of the movable lens and an incident light axis of the image sensor is provided. The image stabilization mechanism includes a support member for supporting one of the movable lens and the image sensor, a base member, a guide shaft secured to the base member and extending in the first direction, where the guide shaft passes through an elongate hole formed in the support member and is disposed in the elongate hole in a slidable manner in the first and second directions, an anti-rolling member fitted into the guide shaft in a slidable manner in an axis direction of the guide shaft, where the anti-rolling member is engaged with the support member in a slidable manner in the second direction that is perpendicular to the first direction so as to prevent rolling of the support member about one of the light axis and the incident light axis, and two driving units configured to move the support member independently in the first direction and the second direction.

According to another embodiment of the present invention, an image stabilization mechanism for moving one of a movable lens and an image sensor in first and second directions perpendicular to one of a light axis of the movable lens and an incident light axis of the image sensor is provided. The image stabilization mechanism includes a support member for supporting one of the movable lens and the image sensor, a base member, a guide shaft secured to the support member and extending in the first direction, where the guide shaft passes through an elongate hole formed in the base member and is disposed in the elongate hole in a slidable manner in the first and second directions, an anti-rolling member fitted into the guide shaft in a slidable manner in an axis direction of the guide shaft, where the anti-rolling member is engaged with the base member in a slidable manner in the second direction that is perpendicular to the first direction so as to prevent rolling of the support member about the light axis or the incident light axis, and two driving units configured to move the support member independently in the first direction and the second direction.

According to still another embodiment of the present invention, an image stabilization mechanism for moving one of a movable lens and an image sensor in first and second directions perpendicular to one of a light axis of the movable lens and an incident light axis of the image sensor is provided. The image stabilization mechanism includes a support member for supporting one of the movable lens and the image sensor, a base member, a guide shaft supported by the base member in a slidable manner in the first direction and engaged with an elongate hole formed in the support member in a slidable manner in the second direction, an anti-rolling member secured to the guide shaft, where the anti-rolling member is engaged with the support member in a slidable manner in the second direction so as to prevent rolling of the support member about one of the light axis and the incident light axis, and two driving units configured to move the support member independently in the first direction and the second direction.

According to yet another embodiment of the present invention, an image stabilization mechanism for moving one of a movable lens and an image sensor in first and second directions perpendicular to one of a light axis of the movable lens and an incident light axis of the image sensor is provided. The image stabilization mechanism includes a support member for supporting one of the movable lens and the image sensor, a base member, a guide shaft supported by the support member in a slidable manner in the first direction and engaged with an elongate hole formed in the base member in a slidable manner in the second direction, an anti-rolling member secured to the guide shaft, where the anti-rolling member is engaged with the base member in a slidable manner in the second direction so as to prevent rolling of the support member about one of the light axis and the incident light axis, and two driving units configured to move the support member independently in the first direction and the second direction.

According to still yet another embodiment of the present invention, an image pickup apparatus is provided. The image pickup apparatus includes an image capturing lens, an image sensor configured to convert an optical image formed through the image capturing lens to an electrical signal, and the image stabilization mechanism according to any one of the above-described embodiments configured to move one of a movable lens provided in the image capturing lens and the image sensor in first and second directions perpendicular to one of a light axis of the movable lens and an incident light axis of the image sensor.

According to the present invention, in an image stabilization mechanism, a support member that supports a movable lens or an image sensor is directly supported by a base member. Thus, the structure is significantly simplified. Accordingly, the structure can be produced with high precision, yet low cost. In addition, an anti-rolling member is secured to or slidably mounted to a guide shaft and is slidably engaged with the support member or the base member. The anti-rolling member prevents rolling of the image stabilization mechanism. Therefore, rolling can be prevented using the significantly simplified structure.

BRIEF DESCRIPTION OF THE DRAWINGS

FIG. 2 is a partially cut-away front view of the image stabilization mechanism;

FIG. 6 is a partially cut-away front view of the image stabilization mechanism;

FIG. 10 is a cross-sectional view taken along a line X-X of FIG. 9;

FIG. 12 is a partially cut-away front view of the image stabilization mechanism;

FIG. 15 is a side view of the anti-rolling member;

FIG. 17 is a side view of the anti-rolling member;

FIG. 19 is a side view of the anti-rolling member;

FIG. 21 is a front view of the main part of the sub-guide portion;

FIG. 23 is a partially cut-away front view of the main part of the sub-guide portion;

FIG. 25 is a front view of the main part of the sub-guide portion;

FIG. 27 is a partially cut-away front view of the main part of the sub-guide portion;

DESCRIPTION OF THE PREFERRED EMBODIMENTS

Exemplary embodiments of an image stabilization mechanism and an image pickup apparatus of the present invention are described with reference to the accompanying drawings.

Figure 1:
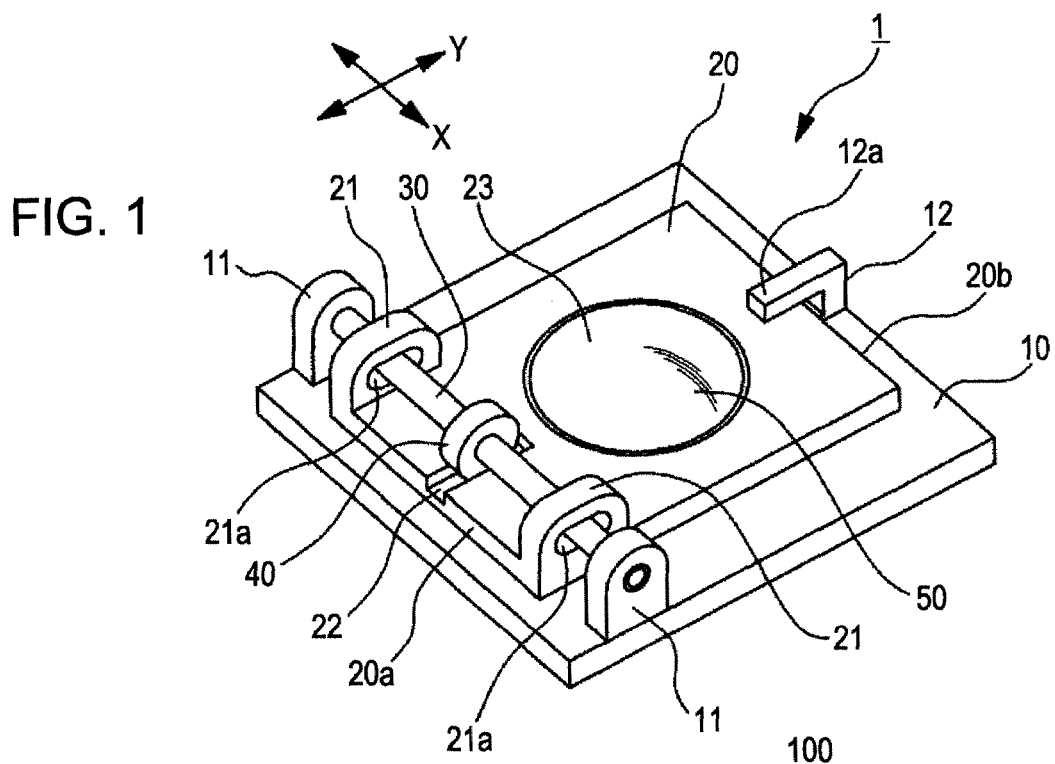
FIG. 1 is a perspective view schematically illustrating the concept of an image stabilization mechanism according to an exemplary embodiment of the present invention.

The concept of an image stabilization mechanism according to an embodiment of the present invention is described first with reference to FIG. 1.

In an image stabilization mechanism 1, a base member 10 is secured to a camera body (not shown) or a lens barrel that is secured to the camera body so as to be stationary with respect to the camera body. A support member 20 for supporting a movable lens or an image sensor is supported by the base member 10 in a movable manner in two directions that are perpendicular to each other. That is, two support projections 11 are provided on one edge portion of the base member 10 in a second direction (a Y direction), one of two directions X and Y that are perpendicular to each other. The support projections 11 are spaced apart in the first direction (the X direction). Either end of a guide shaft 30 is supported by the two support projections 11. Two support projections 21 are formed on one edge portion 20a of the support member 20 so as to be spaced apart in the first direction. An elongate hole 21a is formed in each of the two support projections 21 so as to extend in a second direction (the Y direction). The guide shaft 30 passes through the elongate holes 21a and is slidably disposed in the elongate holes 21a. Additionally, a sub guide 12 is formed on the other edge portion of the base member 10 in the Y direction. The sub guide 12 has an L shape when viewed from the X direction. The sub guide 12 includes a pressure tip 12a having the top end oriented towards the one edge portion of the base member 10 in the Y direction. The pressure tip 12a and the base member 10 slidably pinch the other edge portion 20b of the support member 20. In this way, the support member 20 is supported by the base member 10 in a freely movable manner in an X-Y plane.

Although, as noted above, the support member 20 can be supported by the base member 10 in a freely movable manner in the X-Y plane, the support member 20 may be rotated in the X-Y plane. That is, so-called rolling may occur. Accordingly, to prevent rolling of the support member 20, an anti-rolling member 40 is provided. The anti-rolling member 40 has a disc shape having a certain thickness. The anti-rolling member 40 is fitted into the guide shaft 30 in a slidable manner in the axis direction of the guide shaft 30. A slide groove 22 is formed in the one edge portion of the support member 20 so as to extend in the second direction. The slide groove 22 has a width that is slightly larger than or equal to the thickness of the anti-rolling member 40. The anti-rolling member 40 is slidably engaged with the slide groove 22.

A substantially circular lens-holding hole 23 is formed in the support member 20. A movable lens 50 is fitted into the lens-holding hole 23. A light passing hole (not shown) is formed in the base member 10. The light passing hole has a size that is slightly larger than or equal to the size of the lens-holding hole 23. When image stabilization is performed by shifting an image sensor, the need for the lens-holding hole 23 and the light passing hole is eliminated.

In the image stabilization mechanism 1, a driving unit is needed in order to move the support member 20 independently in the first direction (X direction) and the second direction (Y direction). However, for simplicity, the driving unit is not shown in FIG. 1.

The image stabilization mechanism 1 has the above-described structure. Accordingly, when an X-direction driving unit (not shown) is driven and the driving force is exerted on the support member 20 in the X direction, the two elongate holes 21a of the support member 20 slide along the guide shaft 30 in the X direction. In addition, the anti-rolling member 40 slides together with the support member 20 along the guide shaft 30 via the slide groove 22 in the X direction. Since the slide groove 22 of the support member 20 is engaged with the anti-rolling member 40 and the anti-rolling member 40 is only slidable along the guide shaft 30 in the axis direction of the guide shaft 30 (i.e., the rotation about the axis of the guide shaft 30 is allowed), the support member 20 can move in the X direction without rolling in the X-Y plane. In addition, when a Y-direction driving unit (not shown) is driven and the driving force is exerted on the support member 20 in the Y direction, the two elongate holes 21a of the support member 20 slide along the guide shaft 30 in the Y direction. Furthermore, the anti-rolling member 40 slides in the slide groove 22 in the Y direction. Therefore, the support member 20 moves in the Y direction without rolling in the X-Y plane.

As noted above, in the image stabilization mechanism 1, the support member 20 that supports a movable lens or an image sensor is directly supported by the base member 10. Accordingly, the structure is significantly simplified. Thus, the image stabilization mechanism 1 can be produced with high precision, yet low cost. In addition, since the anti-rolling member 40 that is slidable along the guide shaft 30 and that is slidably engaged with the support member 20 prevents the occurrence of rolling, a mechanism for preventing rolling is significantly simplified.

According to exemplary embodiments of the present invention, in the image stabilization mechanism 1, the guide shaft 30 may be secured to the support member 20 or the anti-rolling member 40. In addition, the elongate holes 21a may be provided in the base member 10. Furthermore, the support member 20 may support an image sensor in place of a movable lens.

Several exemplary embodiments of an image stabilization mechanism are described below with reference to specific structures.

First Exemplary Embodiment

Figure 2:
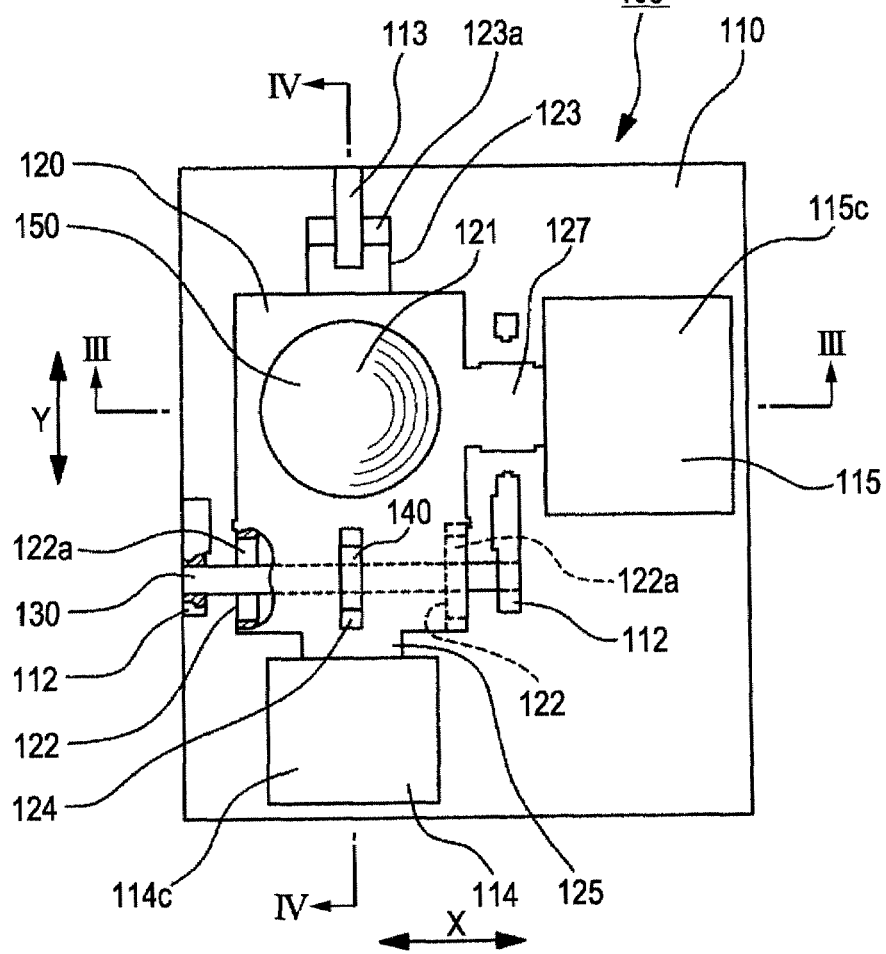
FIG. 2 illustrates an image stabilization mechanism according to a first exemplary embodiment together with FIGS. 3 and 4 and, more specifically.
Figure 3:
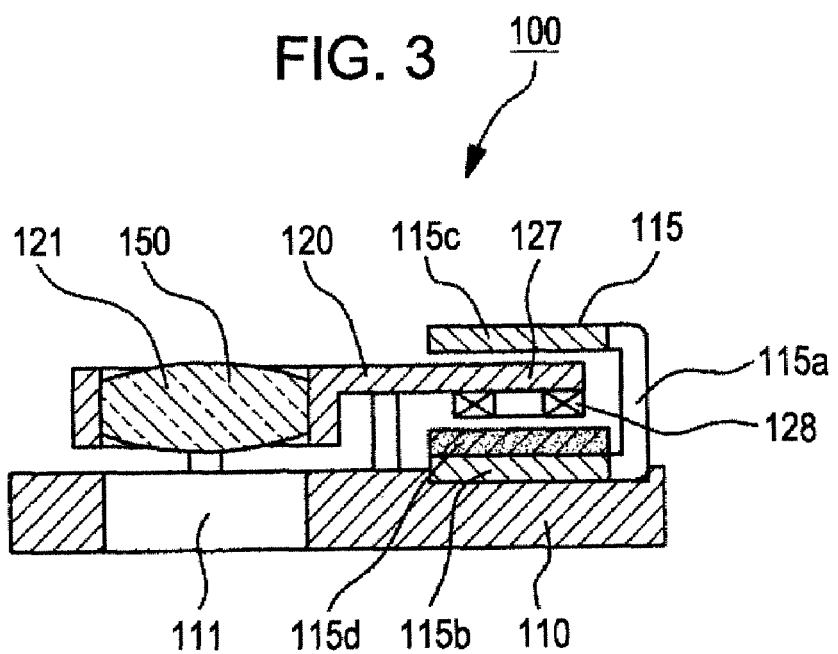
FIG. 3 is a cross-sectional view taken along a line III-III of FIG. 2.
Figure 4:
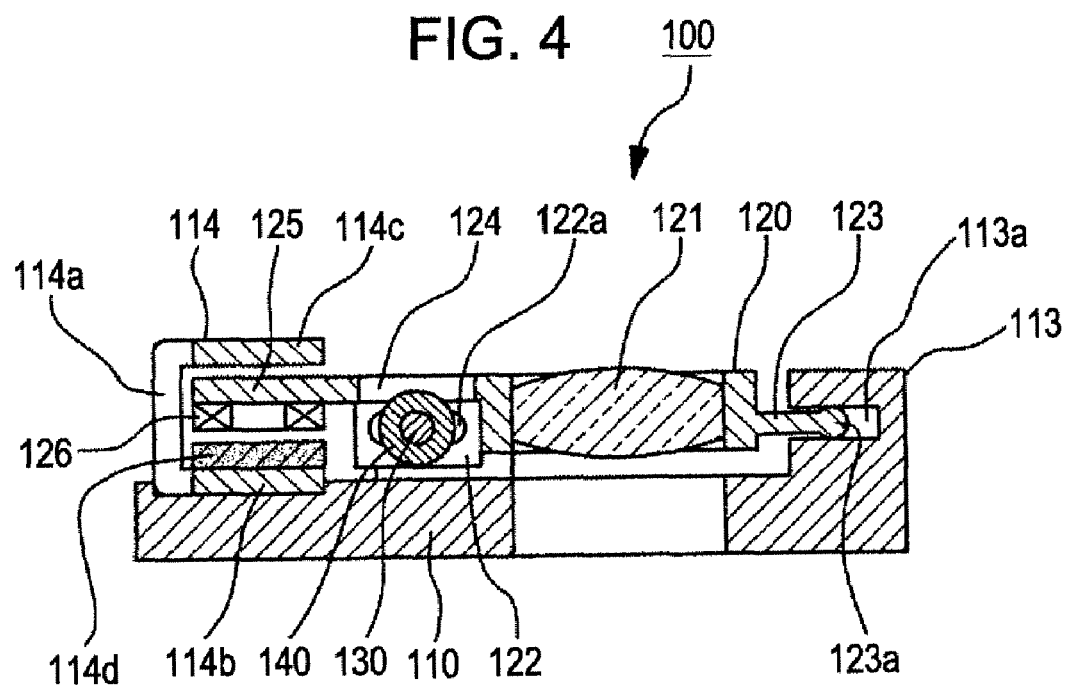
FIG. 4 is a cross-sectional view taken along a line IV-IV of FIG. 2.

FIGS. 2 to 4 illustrate an image stabilization mechanism according to a first exemplary embodiment.

In the first exemplary embodiment and the following second to fourth embodiments, which are described below, the above-described image stabilization mechanism that moves a movable lens of an image-capturing lens system is employed. However, the image stabilization mechanism can be used for shifting an image sensor.

As shown in FIGS. 2 to 4, the image stabilization mechanism of the first exemplary embodiment includes a support member for supporting a movable lens or an image sensor, a base member, a guide shaft secured to the base member and extending in a first direction that is perpendicular to a second direction, an anti-rolling member, and two driving units for moving the support member independently in the first and second directions. The guide shaft passes through an elongate hole formed in the support member and is disposed in the elongate hole in a slidable manner in the first and second directions. The anti-rolling member is fitted into the guide shaft in a slidable manner in the axis direction of the guide shaft and is engaged with the support member in a slidable manner in the second direction so as to prevent the support member from rotating about the light axis or the incident light axis.

An image stabilization mechanism 100 includes a base member 110 and a support member 120. The support member 120 is supported by the base member 110 in a movable manner in two directions that are perpendicular to each other.

The base member 110 has a substantially plate shape. A light passing hole 111 having a substantially circular shape is formed in the base member 110. Two support projections 112 are formed on the base member 110 with a spacing therebetween along the first direction (an X direction shown in FIG. 2). Either end of a guide shaft 130 is secured to the two support projections 112. Thus, the guide shaft 130 extending in the X direction is supported by the base member 110.

A circular lens-holding hole 121 is formed in the support member 120. A movable lens 150 is held in the lens-holding hole 121. Two supported projections 122 are formed on the support member 120 with a spacing therebetween in the X direction. An elongate hole 122a is formed in each of the supported projections 122 so as to extend in the second direction (a Y direction shown in FIG. 2) that is perpendicular the X direction. The guide shaft 130 passes through the elongate holes 122a and is slidably disposed in the elongate holes 122a.

A guided projection 123 protrudes from an edge portion of the support member 120 opposite the edge portion where the supported projections 122 are formed in the Y direction. The guided projection 123 includes a slide portion 123a formed at the top end thereof. The slide portion 123a has a thickness greater than that of the other portion of the guided projection 123. The slide portion 123a has a columnar shape. A sub-guide portion 113 protrudes from the base member 110 at a position corresponding to the guided projection 123 of the support member 120. The sub-guide portion 113 has a guide groove 113a formed therein and extending in the Y direction. The slide portion 123a is slidably engaged with the guide groove 113a. By slidably engaging the slide portion 123a with the guide groove 113a and slidably engaging the guide shaft 130 with the two elongate holes 122a, the support member 120 can be supported by the base member 110 in a movable manner in the X-Y plane.

In order to prevent rolling of the support member 120, an anti-rolling member 140 is provided. The anti-rolling member 140 has a disc shape having a certain thickness. The anti-rolling member 140 is fitted into the guide shaft 130 in a slidable manner in the axis direction of the guide shaft 130. A slide groove 124 is formed in the support member 120 at a position between the two supported projections 122 so as to extend in the Y direction. The anti-rolling member 140 is slidably engaged with the slide groove 124. Thus, rolling of the support member 120 in the X-Y plane can be prevented.

The shape of the anti-rolling member 140 is not limited to a disc shape. For example, a shape that allows the anti-rolling member 140 to be slidable with respect to the guide shaft 130 and the slide groove 124 of the support member 120 would be polygonal, such as rectangular or regular hexagonal. However, the disc shape of the anti-rolling member 140 facilitates the manufacturing of the image stabilization mechanism 100 and eliminates the consideration of assembly directions, which results in a reduction in the cost of the image stabilization mechanism 100. In addition, as mentioned earlier, the anti-rolling member 140 only needs to be slidable along the guide shaft 130 and the slide groove 124, and need not rotate about the guide shaft 130. However, if the anti-rolling member 140 is rotatably supported by the guide shaft 130, the anti-rolling member 140 can rotate when sliding along the slide groove 124. Accordingly, a friction load occurring between the anti-rolling member 140 and the slide groove 124 can be reduced, and therefore, the support member 120 can be easily moved in the second direction.

As shown in FIG. 2, a coil supporting tip 125 protrudes downwards from the lower edge portion of the support member 120 so as to support an X-direction coil 126 with the top end thereof. In addition, a coil supporting tip 127 protrudes from the right edge portion of the support member 120 so as to support a Y-direction coil 128 with the top end thereof.

As shown in FIG. 2, an X-direction driving unit 114 is provided in the lower end portion of the base member 110. The X-direction driving unit 114 includes a yoke member 114a and a magnet 114d. The yoke member 114a has a substantially upward U-shape when viewed from the left-right direction of FIG. 2. The magnet 114d is secured to one yoke part 114b of the yoke member 114a so as to face the X-direction coil 126. Thus, the X-direction coil 126 is disposed between the magnet 114d and the other yoke part 114c of the yoke member 114a. When the X-direction coil 126 is energized, a force is produced in a direction perpendicular to the magnetic field and an electric current, and therefore, a moving force is generated in the X-direction coil 126 in the X direction. This moving force moves the support member 120 in the X direction. At that time, the anti-rolling member 140 moves in the X direction together with the support member 120 so as to slide along the guide shaft 130. In addition, the guide shaft 130 slides in the X direction relative to the elongate holes 122a of the support member 120.

As shown in FIG. 2, a Y-direction driving unit 115 is provided in the right end portion of the base member 110. The Y-direction driving unit 115 includes a yoke member 115a having a substantially leftward U-shape and a magnet 115d. The magnet 115d is secured to one yoke part 115b of the yoke member 115a so as to face the Y-direction coil 128. Thus, the Y-direction coil 128 is disposed between the magnet 115d and the other yoke part 115c of the yoke member 115a. When the Y-direction coil 128 is energized, a force is produced in a direction perpendicular to the magnetic field and the electric current. Thus, a moving force is generated in the Y-direction coil 128 in the Y direction. This moving force moves the support member 120 in the Y direction. At that time, the anti-rolling member 140 slides along the slide groove 124 of the support member 120 in the Y direction. In addition, the guide shaft 130 slides in the Y direction relative to the elongate holes 122a of the support member 120.

As described above, by appropriately energizing the X-direction coil 126 and the Y-direction coil 128, the support member 120 can be moved to any point in the X-Y plane. Accordingly, the movable lens 150 held by the support member 120 can be moved to a desired point.

In the above-described image stabilization mechanism 100, the support member 120 that holds the movable lens 150 is directly supported by the base member 110. Thus, the structure of the image stabilization mechanism 100 is significantly simplified. Accordingly, the structure can be produced with high precision, yet low cost. In addition, the anti-rolling member 140 that is slidable along the guide shaft 130 and that is slidably engaged with the support member 120 prevents rolling of the support member 120. Accordingly, rolling can be prevented with a significantly simplified structure.

Figure 5:
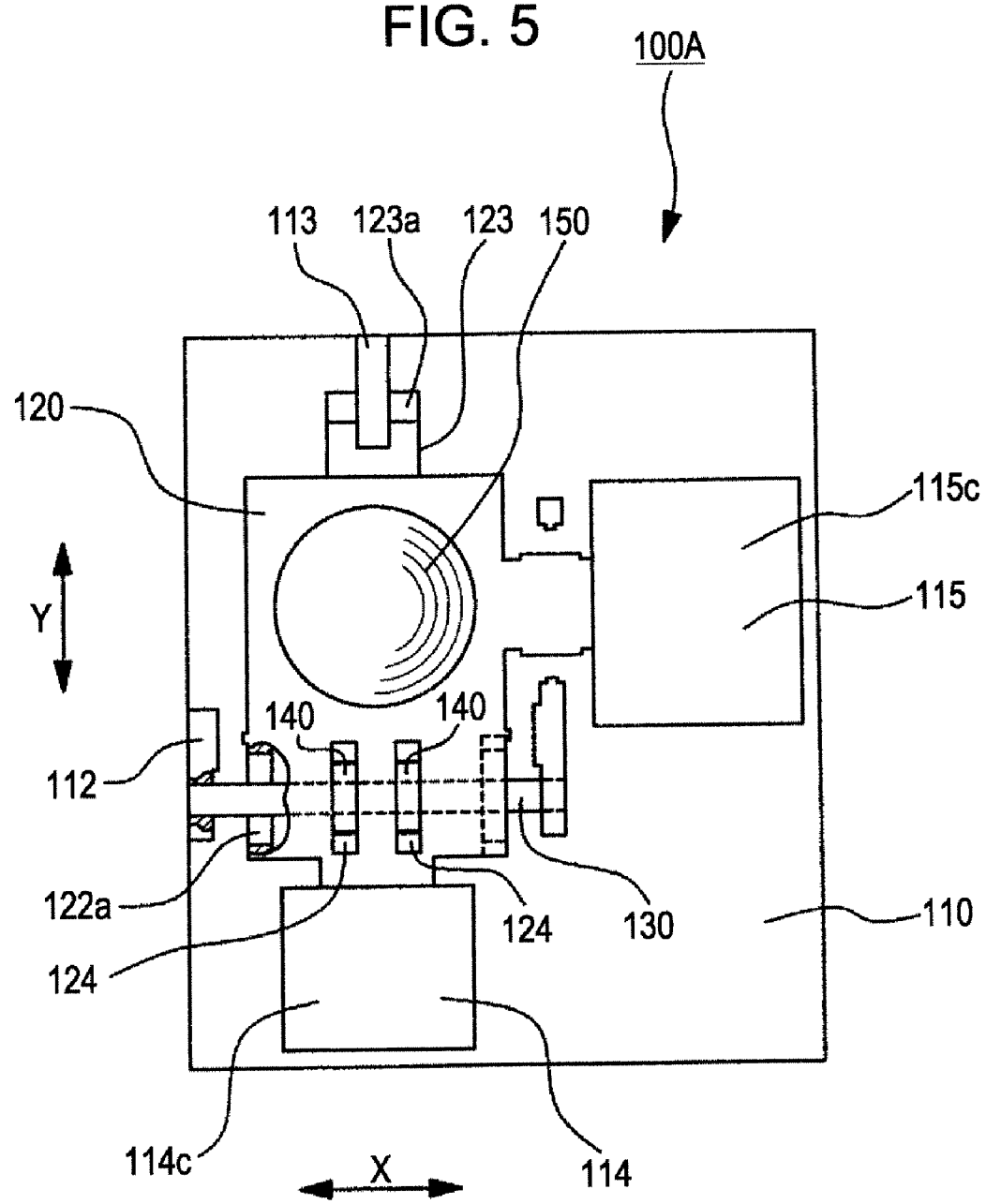
FIG. 5 is a front view of an image stabilization mechanism according to a first modification of the first exemplary embodiment.

FIG. 5 illustrates an image stabilization mechanism 100A, which is a modification of the image stabilization mechanism 100 according to the first exemplary embodiment.

The image stabilization mechanism 100A differs from the image stabilization mechanism 100 in that the image stabilization mechanism 100A includes two of the anti-rolling members 140. The other components are similar to those of the image stabilization mechanism 100. Therefore, similar numbering will be used in describing the image stabilization mechanism 100A as was utilized above in describing the image stabilization mechanism 100, and descriptions thereof are simplified or are not repeated.

In the image stabilization mechanism 100A, two slide grooves 124 are formed on the support member 120 with a spacing therebetween in the X direction. The slide grooves 124 extend in the Y direction. Two anti-rolling members 140 are slidably fitted into the guide shaft 130. Parts of the anti-rolling members 140 are slidably engaged with the slide grooves 124.

In the image stabilization mechanism 100A, the two anti-rolling members 140 are slidably engaged with the support member 120 at two locations. Thus, rolling of the support member 120 can be more reliably prevented.

Second Exemplary Embodiment

Figure 6:
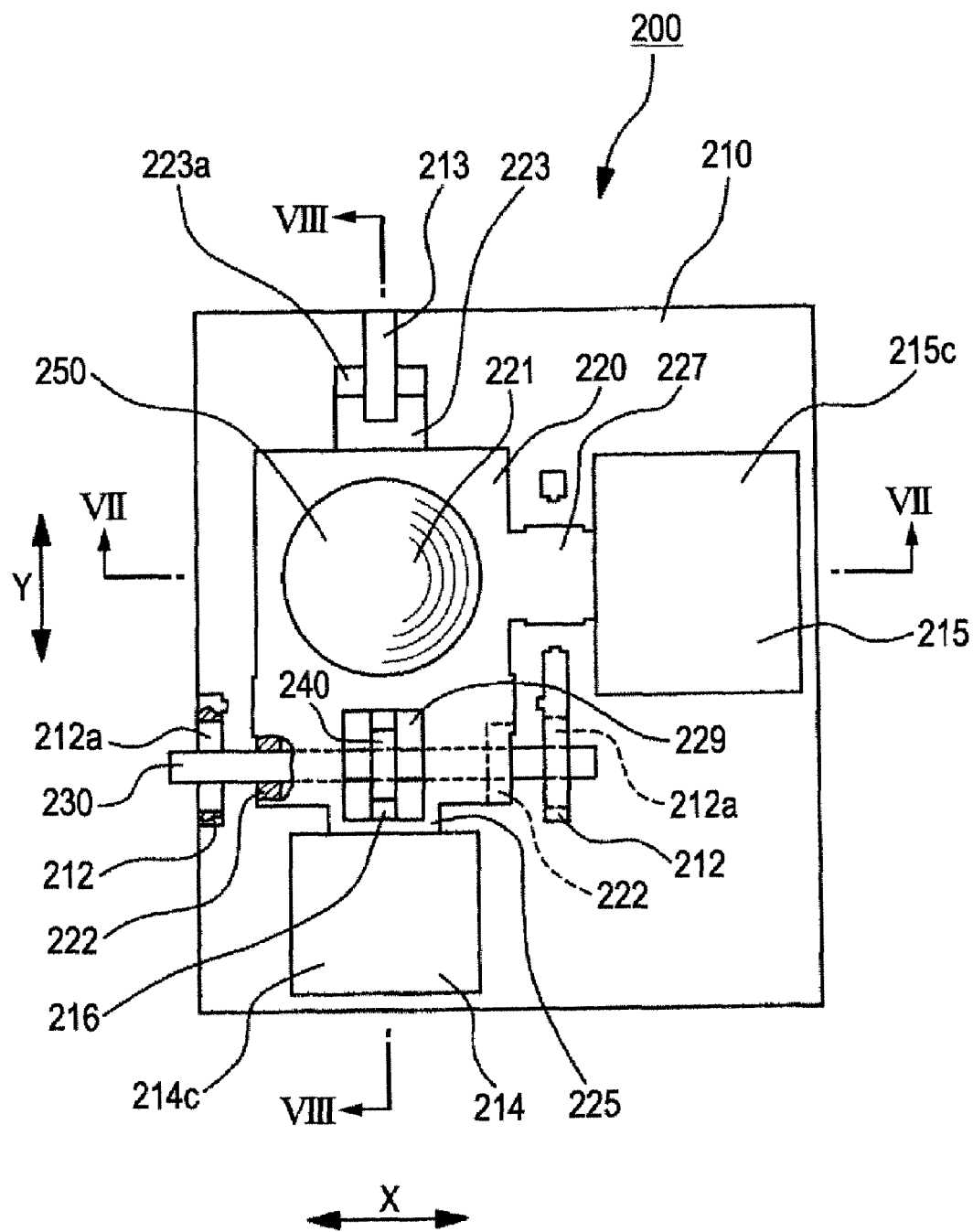
FIG. 6 illustrates an image stabilization mechanism according to a second exemplary embodiment together with FIGS. 7 and 8 and, more specifically.
Figure 7:
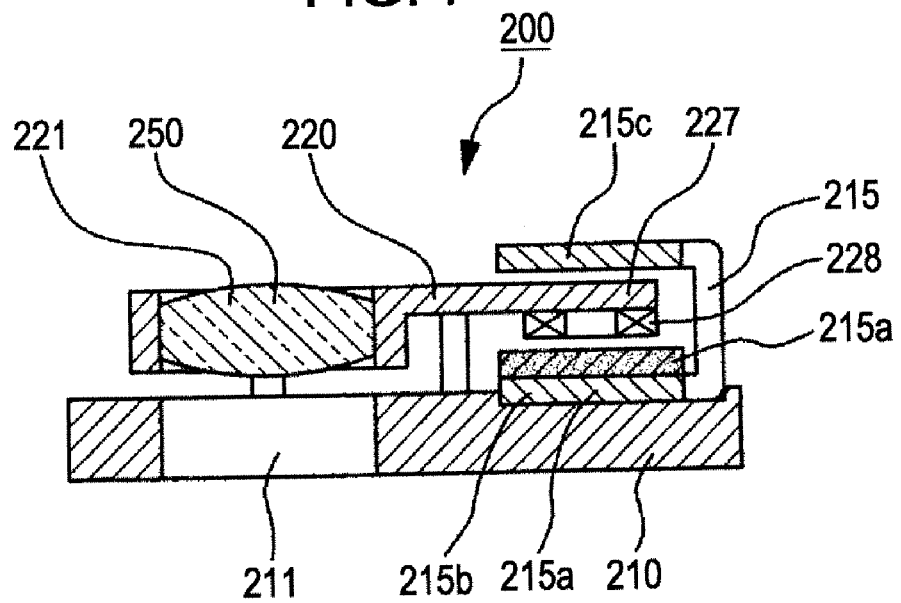
FIG. 7 is a cross-sectional view taken along a line VII-VII of FIG. 6.
Figure 8:
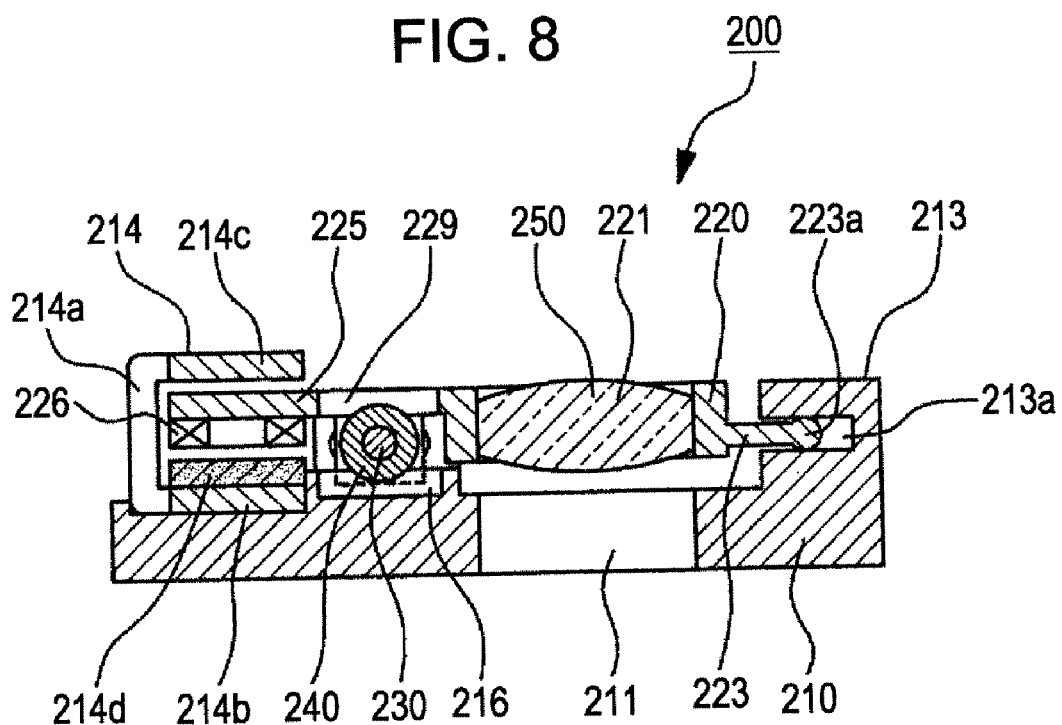
FIG. 8 is a cross-sectional view taken along a line VIII-VIII of FIG. 6.

FIGS. 6 to 8 illustrate an image stabilization mechanism according to a second exemplary embodiment of the present invention.

As shown in FIGS. 6 to 8, the image stabilization mechanism of the second exemplary embodiment includes a support member for supporting a movable lens or an image sensor, a base member, a guide shaft that extends in the first direction and is secured to the support member, an anti-rolling member that is fitted into the guide shaft in a slidable manner in the axis direction of the guide shaft, and two driving units for moving the support member independently in the first and second directions. The guide shaft passes through an elongate hole formed in the base member and is disposed in the elongate hole in a slidable manner in the first direction and a second direction that is perpendicular to the first direction. The anti-rolling member is engaged with the base member in a slidable manner in the second direction so as to prevent the support member from rotating about the light axis or the incident light axis.

An image stabilization mechanism 200 includes a base member 210 and a support member 220 supported by the base member 210 in a movable manner in two directions that are perpendicular to each other. A relationship among the base member 210, the support member 220, a guide shaft 230, and an anti-rolling member 240 of the image stabilization mechanism 200 according to the second exemplary embodiment is different from that of the image stabilization mechanism 100 according to the first exemplary embodiment. The other components are similar to those of the image stabilization mechanism 100 according to the first exemplary embodiment. Accordingly, the different components are described in detail. The other components are designated by reference numerals similar to those of the first exemplary embodiment increased by 100. For example, the reference numeral "1xx" used for describing the image stabilization mechanism 100 is designated by a reference numeral "2xx" to describe the image stabilization mechanism 200, and the description thereof is simplified or is not repeated.

Two support projections 212 are formed on the base member 210 with a spacing therebetween in a first direction (an X direction in FIG. 6). An elongate hole 212a is formed in each of the two support projections 212 so as to extend in a second direction (a Y direction in FIG. 6). In addition, the guide shaft 230 is supported by the elongate holes 212a in a slidable manner in the X and Y directions. Furthermore, a slide groove 216 is formed at a position between the two support projections 212 so as to extend in the Y direction.

As shown in FIG. 6, a supported projection 222 is formed in each of the left and right edge portions of the support member 220. The two supported projections 222 securely support portions of the guide shaft 230 in the vicinity of the top ends of the guide shaft 230. In addition, a through-hole 229 having a substantially rectangular shape is formed in the support member 220 at a position between the two supported projections 222.

An anti-rolling member 240 having a substantially disc shape is fitted into the guide shaft 230 in a slidable manner along the axis direction of the guide shaft 230. Additionally, the anti-rolling member 240 is engaged with the slide groove 216 formed in the base member 210 in a slidable manner in the Y direction. The through-hole 229 formed in the support member 220 is sufficiently larger than the anti-rolling member 240 so that part of the peripheral portion of the anti-rolling member 240 is relatively movable in the through-hole 229.

A slide portion 223a formed at the top end of a guided projection 223 is engaged with a guide groove 213a of a sub-guide portion 213 formed on the base member 210 in a slidable manner in the X and Y directions.

As described above, the anti-rolling member 240 is slidable only in the Y direction. Since the anti-rolling member 240 is fitted into the guide shaft 230 in a slidable manner in the X direction, the guide shaft 230 is restricted to extend in the X direction. Accordingly, the support member 220 slidably engaged with the guide shaft 230 whose movement is restricted in this manner is prevented from rolling.

The shape of the anti-rolling member 240 is not limited to a disc shape. For example, a shape that allows the anti-rolling member 240 to be slidable along the guide shaft 230 and the slide groove 216 formed in the base member 210 would be polygonal, such as rectangular or regular hexagonal. However, the disc shape of the anti-rolling member 240 facilitates the manufacturing of the image stabilization mechanism 200 and eliminates the consideration of assembly directions, which results in a reduction in the cost of the image stabilization mechanism 200. In addition, as mentioned earlier, the anti-rolling member 240 only needs to be slidable along the guide shaft 230 and the slide groove 216 formed in the base member 210, and need not rotate about the guide shaft 230. However, if the anti-rolling member 240 is rotatably supported by the guide shaft 230, the anti-rolling member 240 can rotate when sliding along the slide groove 216. Accordingly, a friction load occurring between the anti-rolling member 240 and the slide groove 216 can be reduced, and therefore, the support member 220 can be easily moved in the second direction.

When an X-direction coil 226 is energized, the guide shaft 230 secured to the support member 220 slides in the two elongate holes 212a provided in the base member 210. At that time, the guide shaft 230 also slides relative to the anti-rolling member 240. In addition, since the anti-rolling member 240 is slidable only in the Y direction, the guide shaft 230 slides only in the X direction. Therefore, the support member 220 secured to the guide shaft 230 is moved in the X direction without rolling. In contrast, when a Y-direction coil 228 is energized, the guide shaft 230 secured to the support member 220 slides in the elongate holes 212a provided in the base member 210. At that time, since the anti-rolling member 240 to which the guide shaft 230 is slidably fitted is slidable only in the Y direction, the guide shaft 230 slides in the elongate holes 212a in the Y direction. Therefore, the support member 220 is moved in the Y direction without rolling thereof.

Accordingly, by appropriately energizing the X-direction coil 226 and the Y-direction coil 228, the support member 220 can be moved to any point in the X-Y plane. Accordingly, a movable lens 250 held by the support member 220 can be moved to a desired point.

In the above-described image stabilization mechanism 200, the support member 220 that holds the movable lens 250 is directly supported by the base member 210. Thus, the structure of image stabilization mechanism 200 is significantly simplified. Accordingly, the structure can be produced with high precision, yet low cost. In addition, the anti-rolling member 240 that is slidable along the guide shaft 230 and that is slidably engaged with the base member 210 prevents rolling of the support member 220. Accordingly, rolling can be prevented with a significantly simplified structure.

Third Exemplary Embodiment

Figure 9:
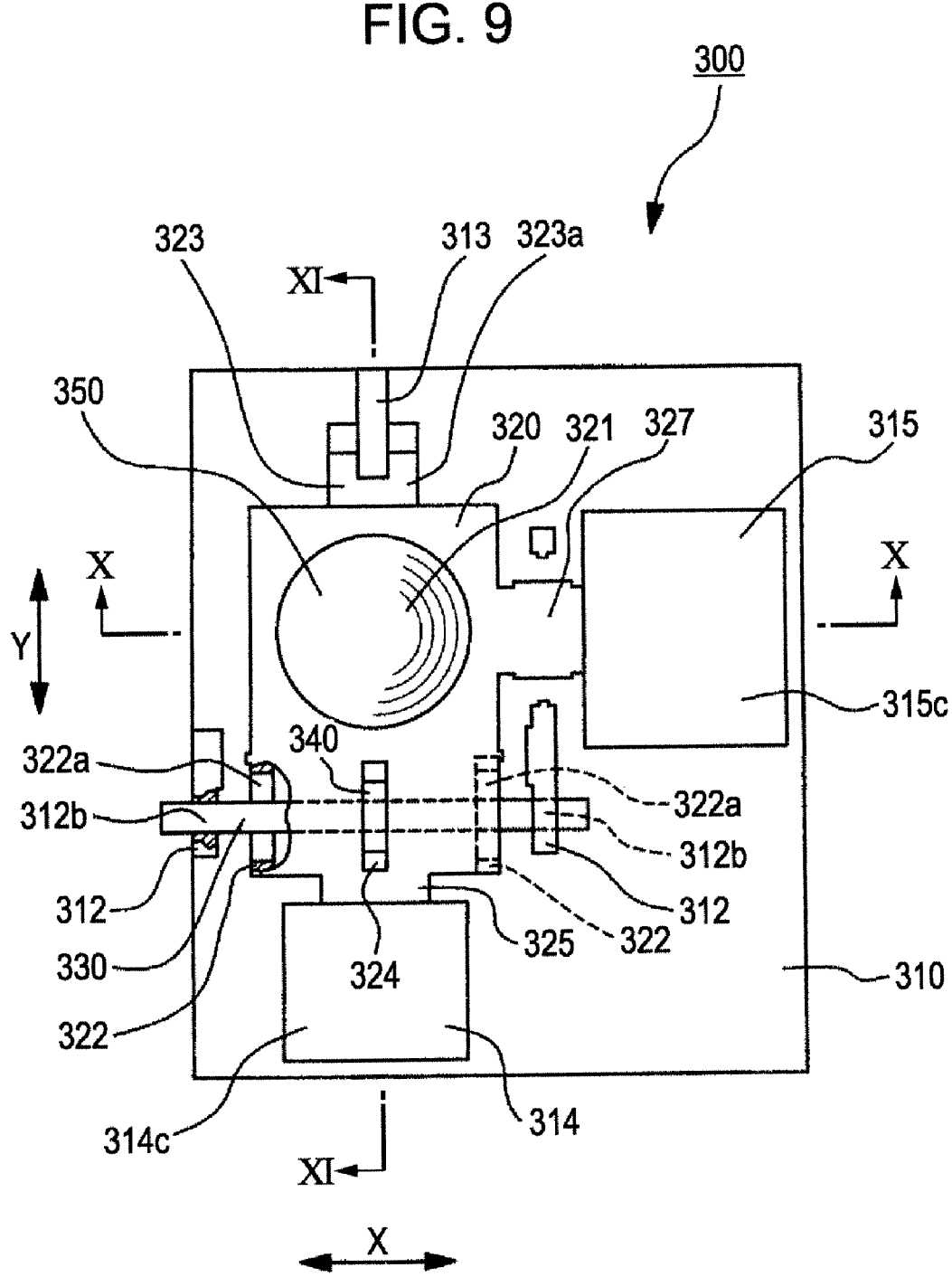
FIG. 9 illustrates an image stabilization mechanism according to a third exemplary embodiment together with FIGS. 10 and 11 and, more specifically.
Figure 10:
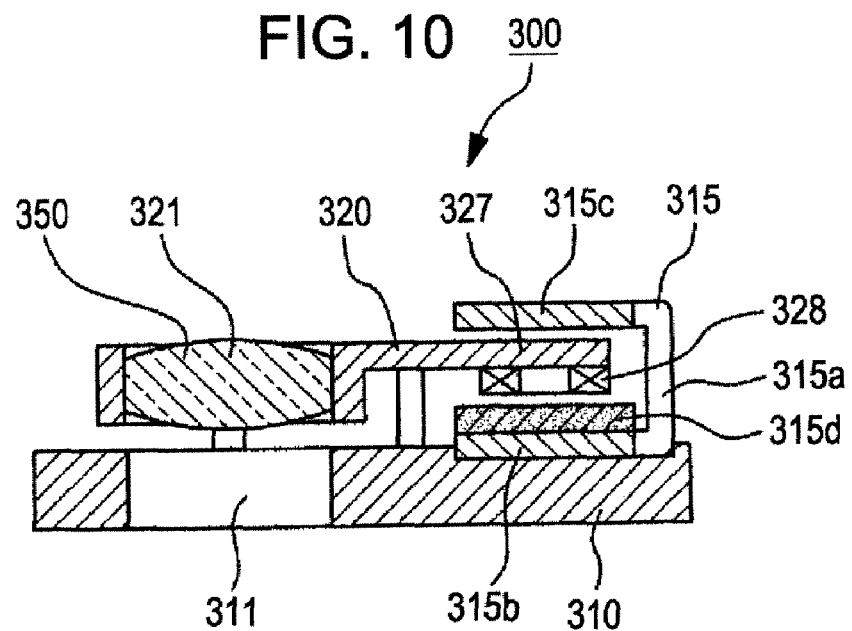
FIG. 10 is a partially cut-away front view of the image stabilization mechanism.
Figure 11:
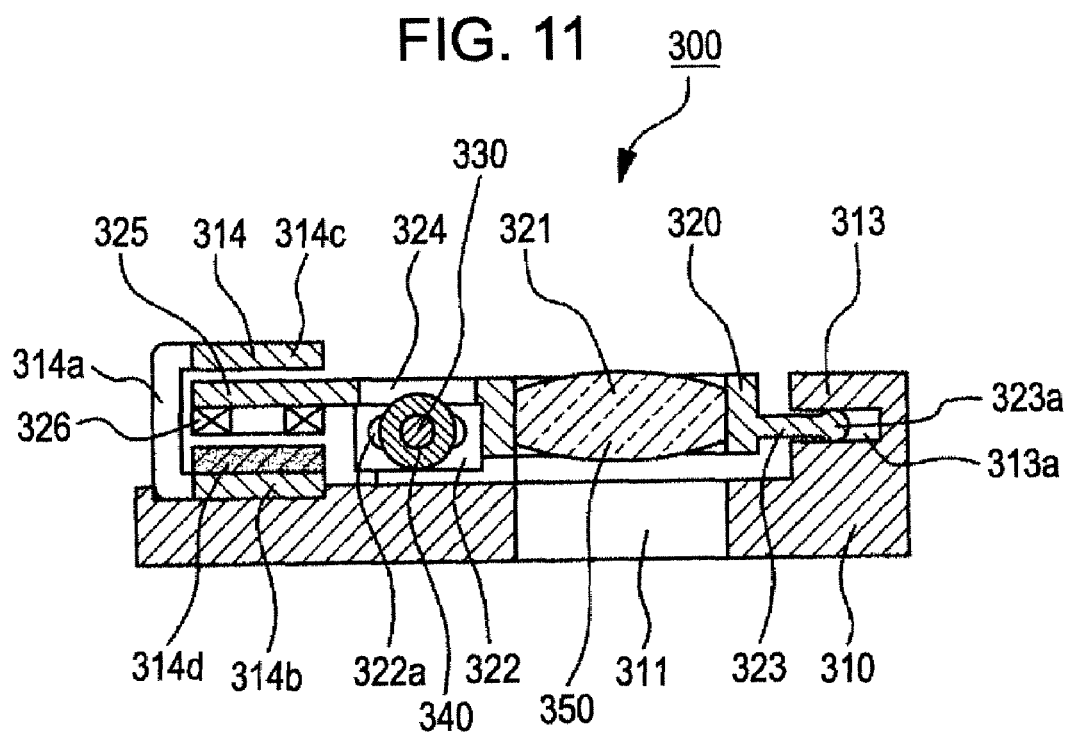
FIG. 11 is a cross-sectional view taken along a line XI-XI of FIG. 9.

FIGS. 9 to 11 illustrate an image stabilization mechanism according to a third exemplary embodiment of the present invention.

As shown in FIGS. 9 to 11, the image stabilization mechanism of the third exemplary embodiment includes a support member for supporting a movable lens or an image sensor, a base member, a guide shaft that is supported by the base member in a slidable manner in the first direction and that is engaged with an elongate hole formed in the base member in a slidable manner in the second direction, an anti-rolling member that is secured to the guide shaft and that is engaged with the support member in a slidable manner in the second direction so as to prevent the support member from rotating about the light axis or the incident light axis, and two driving units for moving the support member independently in the first and second directions.

An image stabilization mechanism 300 includes a base member 310 and a support member 320 supported by the base member 310 in a movable manner in two directions that are perpendicular to each other. A relationship among the base member 310, the support member 320, a guide shaft 330, and an anti-rolling member 340 of the image stabilization mechanism 300 according to the third exemplary embodiment is different from those of the image stabilization mechanisms 100 and 200 according to the first and second exemplary embodiments. The other components are similar to those of the image stabilization mechanisms 100 and 200 according to the first and second exemplary embodiments. Accordingly, the different components are described in detail. The other components are designated by reference numerals similar to those of the first exemplary embodiment increased by 200. For example, the reference numeral "1xx" or "2xx" used for describing the image stabilization mechanism 100 or 200 is designated by a reference numeral "3xx" to describe the image stabilization mechanism 300, and description thereof is simplified or is not repeated.

Two support projections 312 are formed on the base member 310 with a spacing therebetween in a first direction (an X direction in FIG. 9). A slide hole 312b is formed in each of the two support projections 312 so as to extend in the X direction. In addition, the guide shaft 330 is supported by the two slide holes 312b in a slidable manner in the X direction.

Two supported projections 322 are formed on the support member 320 with a spacing therebetween in the X direction. An elongate hole 322a is formed in each of the two supported projections 322 so as to extend in a second direction (a Y direction in FIG. 9) that is perpendicular to the X direction. In addition, the guide shaft 330 passes through the two the elongate holes 322a and is disposed in the elongate holes 322a in a slidable manner in the X and Y directions. A slide groove 324 is formed in the support member 320 at the middle position between the two supported projections 322 so as to extend in the Y direction.

A substantially disc-shaped anti-rolling member 340 having a certain thickness is secured to the guide shaft 330 and is engaged with the slide groove 324 formed in the support member 320 in a slidable manner in the Y direction.

In addition, a slide portion 323a is formed at the top end of a guided projection 323 of the support member 320. The slide portion 323a is engaged with a guide groove 313a of a sub-guide portion 313 formed on the base member 310 in a slidable manner in the X and Y directions.

As mentioned earlier, the anti-rolling member 340 is secured to the guide shaft 330 extending in the X direction. The support member 320 is engaged with the anti-rolling member 340 in a slidable manner in the Y direction. Thus, the support member 320 is supported by the base member 310 in a slidable manner in the X and Y directions with rolling thereof being prevented in the X-Y plane.

The shape of the anti-rolling member 340 is not limited to a disc shape. For example, a shape that allows the anti-rolling member 340 to be slidable along the slide groove 324 formed in the support member 320 would be polygonal, such as rectangular or regular hexagonal. However, the disc shape of the anti-rolling member 340 facilitates the manufacturing of the image stabilization mechanism and eliminates the consideration of assembly directions, thus reducing the cost of the image stabilization mechanism 300.

When an X-direction coil 326 is energized, a moving force is applied to the support member 320 in the X direction. The moving force applied to the support member 320 in the X direction is transferred to the anti-rolling member 340 via the slide groove 324. Accordingly, the guide shaft 330 secured to the anti-rolling member 340 is moved in the X direction while sliding in the two slide holes 312b of the base member 310. At that time, since the support member 320 is engaged with the anti-rolling member 340 in a slidable manner in the Y direction, the support member 320 is moved in the X direction without rolling thereof. In contrast, when a Y-direction coil 328 is energized, a moving force is applied to the support member 320 in the Y direction. Since the slide groove 324 of the support member 320 is engaged with the anti-rolling member 340 in a slidable manner in the Y direction, the support member 320 is guided by the anti-rolling member 340 so as to be moved in the Y direction without rolling thereof. At that time, the guide shaft 330 slides along the two elongate holes 322a of the support member 320 in the Y direction.

Accordingly, by appropriately energizing the X-direction coil 326 and the Y-direction coil 328, the support member 320 can be moved to any point in the X-Y plane. Accordingly, a movable lens 350 held by the support member 320 can be moved to a desired point.

In the above-described image stabilization mechanism 300, the support member 320 that holds the movable lens 350 is directly supported by the base member 310. Thus, the structure of image stabilization mechanism 300 is significantly simplified. Accordingly, the structure can be produced with high precision, yet low cost. In addition, the anti-rolling member 340 that is secured to the guide shaft 330 and that is slidably engaged with the support member 320 can prevent rolling of the support member 320. Accordingly, rolling can be prevented with a significantly simplified structure.

Fourth Exemplary Embodiment

Figure 12:
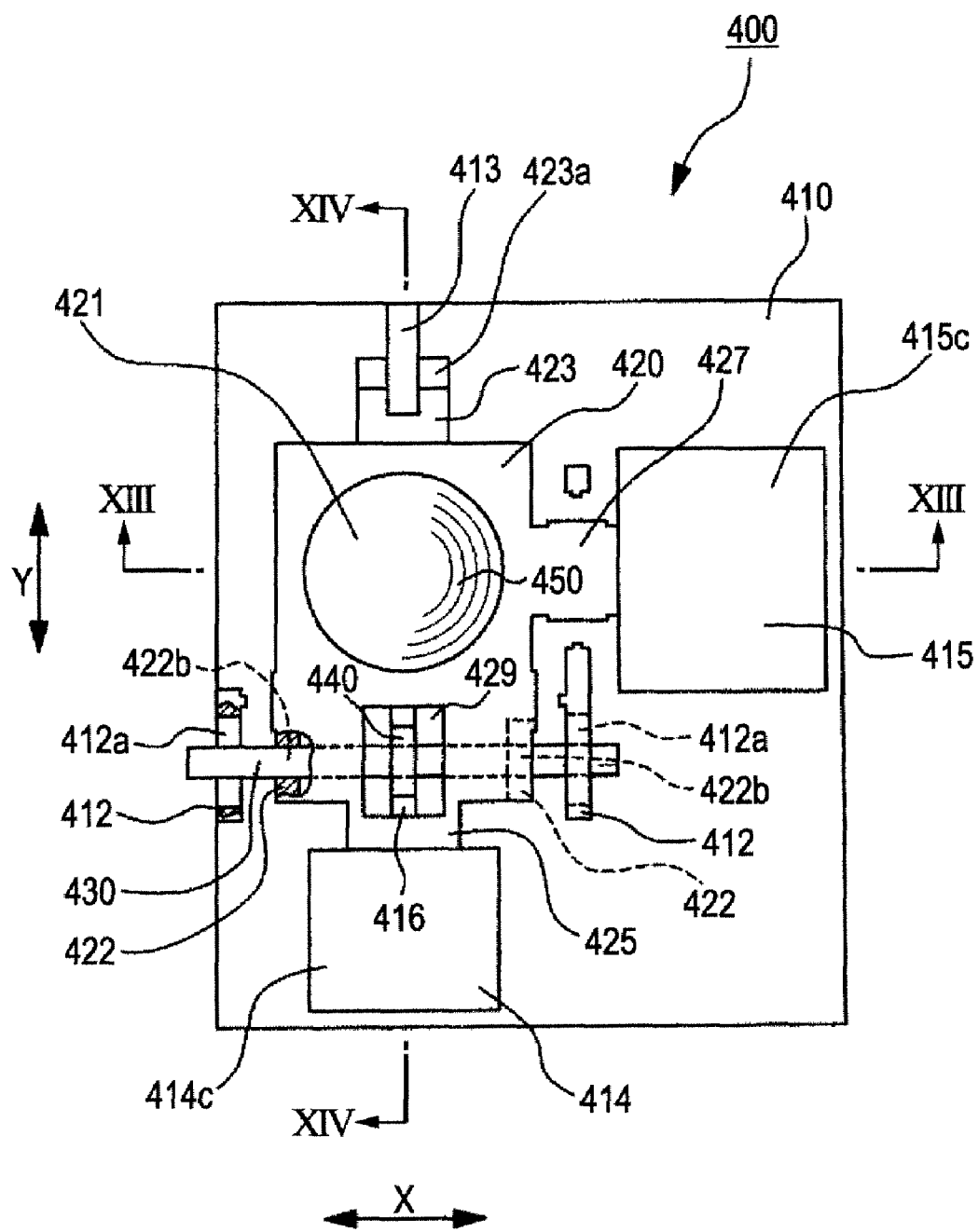
FIG. 12 illustrates an image stabilization mechanism according to a fourth exemplary embodiment together with FIGS. 13 and 14 and, more specifically.
Figure 13:
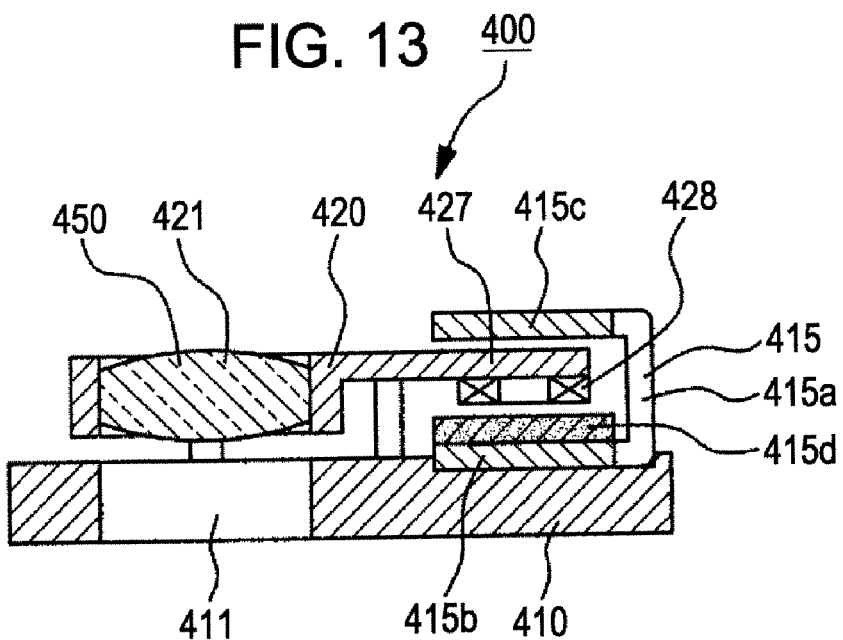
FIG. 13 is a cross-sectional view taken along a line XIII-XIII of FIG. 12.
Figure 14:
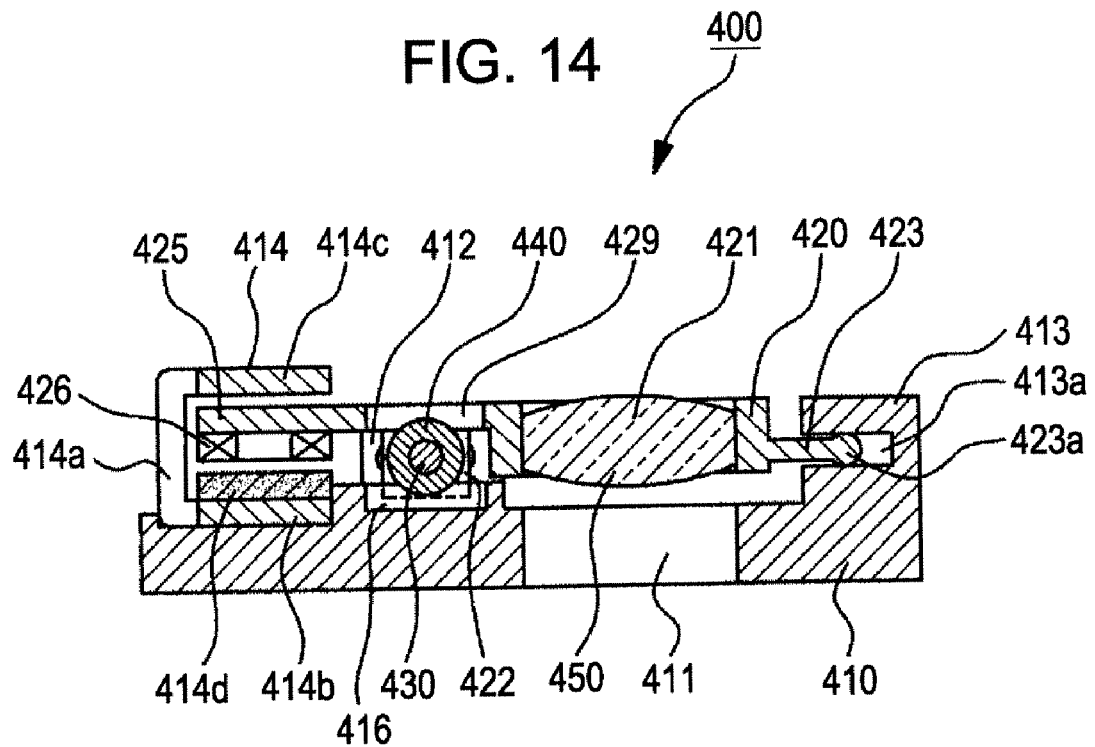
FIG. 14 is a cross-sectional view taken along a line XIV-XIV of FIG. 12.

FIGS. 12 to 14 illustrate an image stabilization mechanism according to a fourth exemplary embodiment of the present invention.

As shown in FIGS. 12 to 14, the image stabilization mechanism of the fourth exemplary embodiment includes a support member for supporting a movable lens or an image sensor, a base member, a guide shaft that is supported by the support member in a slidable manner in the first direction and that is engaged with an elongate hole formed in the base member in a slidable manner in the second direction, an anti-rolling member that is secured to the guide shaft and that is engaged with the base member in a slidable manner in the second direction so as to prevent the support member from rotating about the light axis or the incident light axis, and two driving units for moving the support member independently in the first and second directions.

An image stabilization mechanism 400 includes a base member 410 and a support member 420 supported by the base member 410 in a movable manner in two directions that are perpendicular to each other. A relationship among the base member 410, the support member 420, a guide shaft 430, and an anti-rolling member 440 of the image stabilization mechanism 400 according to the fourth exemplary embodiment is different from those of the image stabilization mechanisms 100, 200, and 300 according to the first, second, and third exemplary embodiments. The other components are similar to those of the image stabilization mechanisms 100, 200, and 300 according to the first, second, and third exemplary embodiments. Accordingly, the different components are described in detail. The other components are designated by reference numerals similar to those of the first exemplary embodiment increased by 300. For example, the reference numeral "1xx", "2xx", or "3xx" used for describing the image stabilization mechanism 100, 200, or 300 is designated by a reference numeral "4xx" to describe the image stabilization mechanism 400, and description thereof is simplified or is not repeated.

Two support projections 412 are formed on the base member 410 with a spacing therebetween in a first direction (an X direction in FIG. 12) that is perpendicular to a second direction. An elongate hole 412a is formed in each of the two support projections 412 so as to extend in the second direction (the Y direction in FIG. 12). In addition, a slide groove 416 extending in the Y direction is formed in the base member 410 at the middle position between the two support projections 412.

Two supported projections 422 are formed on the support member 420 with a spacing therebetween in the X direction. A slide hole 422b extending in the X direction is formed in each of the two supported projections 422. In addition, a through-hole 429 having a substantially rectangular shape is formed in the support member 420 at a position between the two supported projections 422.

Portions of the guide shaft 430 in the vicinities of the top ends of the guide shaft 430 pass through slide holes 422a of the support member 420 and are disposed in the slide holes 422a in a slidable manner in the X direction. The top ends of the guide shaft 430 pass through the two elongated holes 412a of the base member 410 and are disposed in the elongate holes 412a in a slidable manner in the X and Y directions.

The anti-rolling member 440 having a substantially disc shape is secured to the guide shaft 430 and is engaged with the slide groove 416 of the base member 410 in a slidable manner in the Y direction. Part of the peripheral portion of the anti-rolling member 440 is located in the through-hole 429 of the support member 420.

As described above, the anti-rolling member 440 is engaged with the slide groove 416 of the base member 410 in a slidable manner in the Y direction. The anti-rolling member 440 is secured to the guide shaft 430 extending in the X direction. The support member 420 is engaged with the guide shaft 430 in a slidable manner in the X direction. Thus, the support member 420 is supported by the base member 410 in a movable manner in the X and Y directions with rolling movement thereof being prevented.

The shape of the anti-rolling member 440 is not limited to a disc shape. For example, a shape that allows the anti-rolling member 440 to be slidable along the slide groove 416 formed in the base member 410 would be polygonal, such as rectangular or regular hexagonal. However, the disc shape of the anti-rolling member 440 facilitates the manufacturing of the image stabilization mechanism and eliminates the consideration of assembly directions, which results in a reduction in the cost of the image stabilization mechanism 400.

When an X-direction coil 426 is energized, a moving force is applied to the support member 420 in the X direction. Accordingly, the support member 420 moves along the guide shaft 430. At that time, since the anti-rolling member 440 is secured to the guide shaft 430 and is engaged with the slide groove 416 formed in the base member 410 and extending in the Y direction, the guide shaft 430 is disposed so as to extend in the X direction without tilting. Accordingly, the support member 420 is moved along the guide shaft 430 in the X direction without rolling thereof. In contrast, when a Y-direction coil 428 is energized, a moving force is applied to the support member 420 in the Y direction. Accordingly, the guide shaft 430 moves in the Y direction together with the support member 420. At that time, since the anti-rolling member 440 is secured to the guide shaft 430 and is moved along the slide groove 416 formed in the base member 410 in the Y direction, the guide shaft 430 slides in the two elongate holes 412a formed in the base member 410 in the Y direction. Accordingly, the support member 420 is moved in the Y direction without rolling thereof.

Accordingly, by appropriately energizing the X-direction coil 426 and the Y-direction coil 428, the support member 420 can be moved to any point in the X-Y plane. Accordingly, a movable lens 450 held by the support member 420 can be moved to a desired point.

In the above-described image stabilization mechanism 400, the support member 420 that holds the movable lens 450 is directly supported by the base member 410. Thus, the structure of image stabilization mechanism 400 is significantly simplified. Accordingly, the structure can be produced with high precision, yet low cost. In addition, the anti-rolling member 440 that is secured to the guide shaft 430 and that is slidably engaged with the base member 410 can prevent rolling of the support member 420. Accordingly, rolling can be prevented with a significantly simplified structure.

Modifications of the above-described anti-rolling member are described below.

Figure 15:
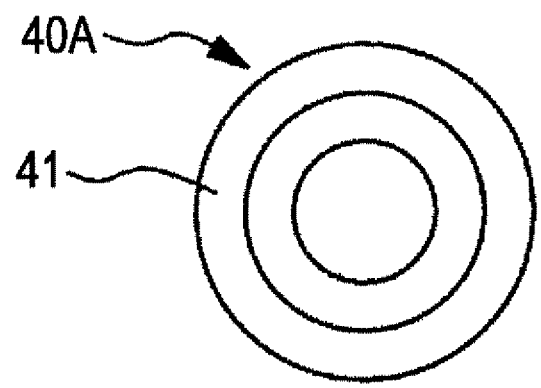
FIG. 15 illustrates an anti-rolling member according to a first modification together with FIG. 16 and, more specifically.
Figure 16:
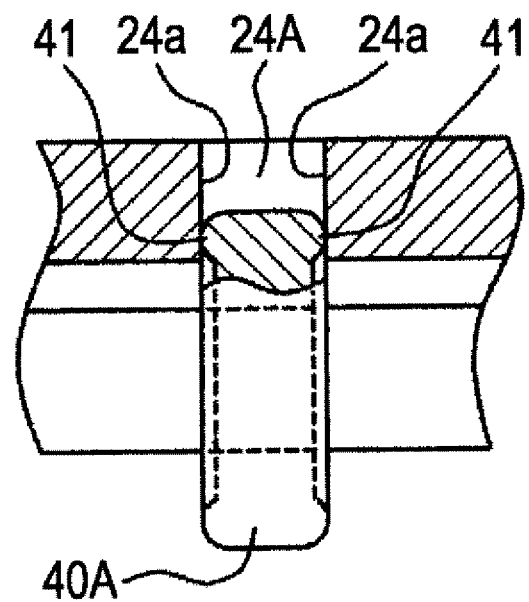
FIG. 16 is a cross-sectional view of the anti-rolling member when engaged with a slide groove.

FIGS. 15 and 16 illustrate a first modification of the anti-rolling member.

According to the first modification, at least part of the anti-rolling member is disposed between two guide surfaces each extending in the second direction and in parallel to the support member. In addition, contact protrusions that contact the guide surfaces are formed on the at least part of the anti-rolling member.

An anti-rolling member 40A is formed so as to have a relatively thick disc shape. Two contact protrusions 41 are formed in the entire peripheral portions on either side of the anti-rolling member 40A. When the anti-rolling member 40A having such a structure is engaged with a slide groove 24A formed in a support member or a base member, the top ends of the contact protrusions 41 are in contact with two parallel guide surfaces 24a that form the slide groove 24A.

As described above, since only top ends of the contact protrusions 41 are in contact with the two parallel guide surfaces 24a, the contact area is small. Accordingly, a friction load is reduced when the anti-rolling member 40A slides along the slide groove 24A, and therefore, a smooth movement of the support member can be assured.

Figure 17:
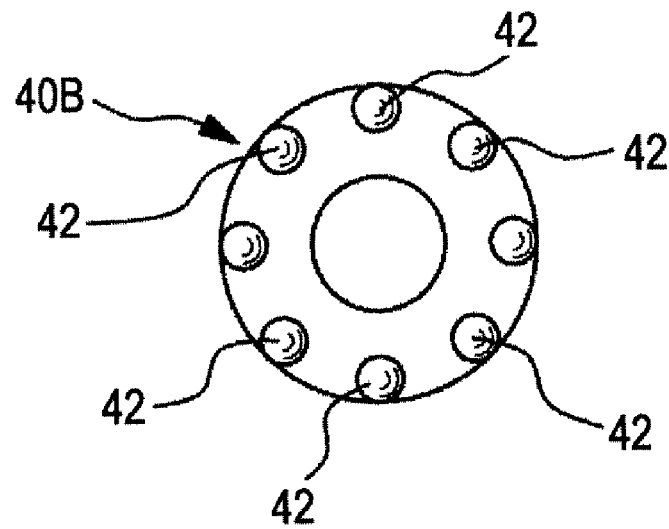
FIG. 17 illustrates an anti-rolling member according to a second modification together with FIG. 18 and, more specifically.
Figure 18:
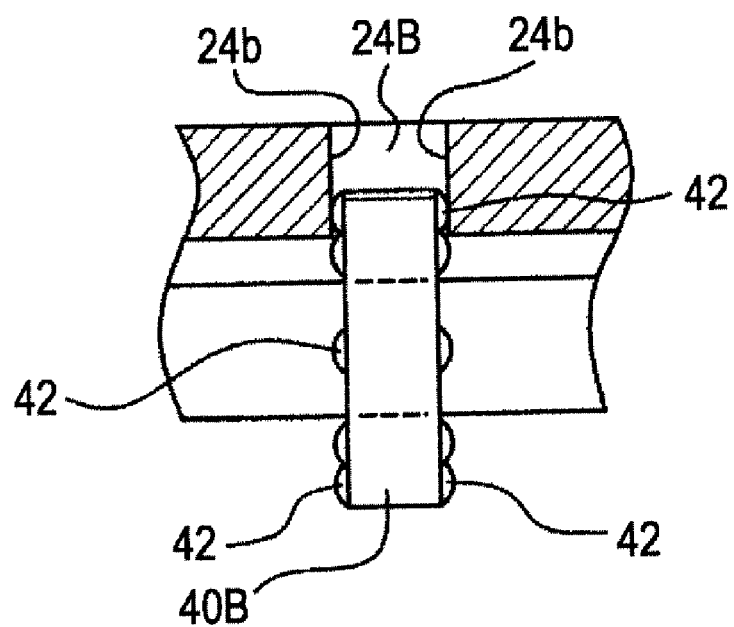
FIG. 18 is a cross-sectional view of the anti-rolling member when engaged with a slide groove.

FIGS. 17 and 18 illustrate a second modification of the anti-rolling member.

According to the second modification, at least part of the anti-rolling member is disposed between two guide surfaces each extending in the second direction and in parallel to the support member. In addition, contact protrusions that contact the guide surfaces are formed on the at least part of the anti-rolling member.

An anti-rolling member 40B is formed so as to have a relatively thick disc shape. Dot contact protrusions 42 are formed at predetermined intervals in the peripheral portions on either side of the anti-rolling member 40B. When the anti-rolling member 40B having such a structure is engaged with a slide groove 24B formed in a support member or a base member, the top ends of the contact protrusions 42 are in contact with two parallel guide surfaces 24b that form the slide groove 24B.

As described above, since only top ends of the contact protrusions 42 are in contact with the two parallel guide surfaces 24b, the contact area is small. Accordingly, a friction load is reduced when the anti-rolling member 40B slides along the slide groove 24B, and therefore, a smooth movement of the support member can be assured.

Figure 19:
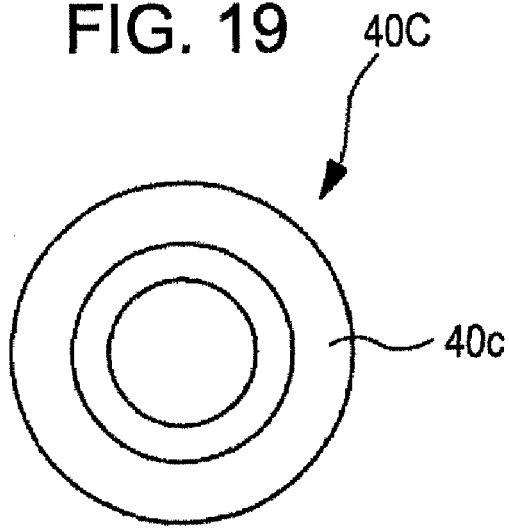
FIG. 19 illustrates an anti-rolling member according to a third modification together with FIG. 20 and, more specifically.
Figure 20:
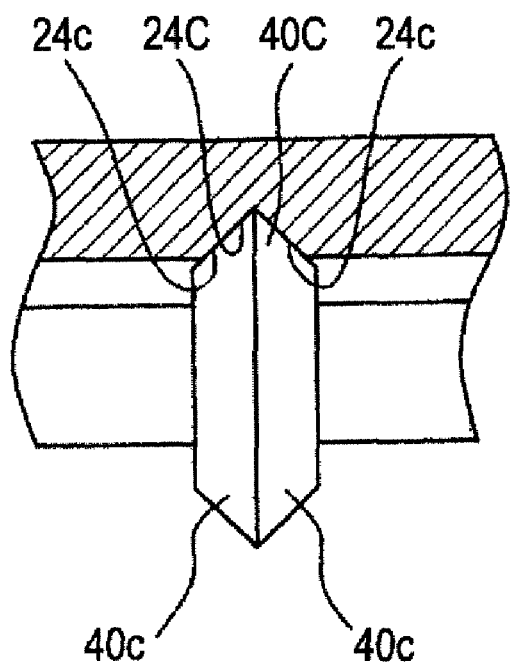
FIG. 20 is a cross-sectional view of the anti-rolling member when engaged with a slide groove.

FIGS. 19 and 20 illustrate a third modification of the anti-rolling member.

An anti-rolling member 40C is formed so as to have a relatively thick disc shape. The peripheral portion of the anti-rolling member 40C has a V-shaped cross section so that the thickness of the peripheral portion decreases towards the periphery. Thus, the peripheral portion has sloped surfaces 40c formed on either side. A slide groove 24C formed in a support member or a base member has a V-shaped cross section and has sloped guide surfaces 24c. The angle of each of the sloped guide surfaces 24c is substantially the same as that of the sloped surface 40c of the anti-rolling member 40C.

The anti-rolling member 40C slides or rotationally moves with the sloped surfaces 40c of the anti-rolling member 40C in contact with the sloped guide surfaces 24c of the slide groove 24C.

In the third modification, since the sloped surfaces 40c of the anti-rolling member 40C are in contact with the sloped guide surfaces 24c of the slide groove 24C, the anti-rolling member 40C moves with the center of the anti-rolling member 40C aligned with the center of the slide groove 24C. Accordingly, the support member can be moved without being shifted.

Any one of the three above-described modifications can be applied to the above-described first to fourth embodiments. In addition, any one of the three above-described modifications can be applied to an image stabilization mechanism according to an embodiment other than the above-described first to fourth exemplary embodiments.

The three above-described modifications are examples of the shape of the anti-rolling member. However, it should be understood by those skilled in the art that other various modifications may be applied to the anti-rolling member.

Modifications of the sub-guide portion are described next. The components other than the sub-guide portion can be applied to any one of the first to fourth exemplary embodiments. Therefore, the components other than the sub-guide portion are not shown in the following drawings.

Figure 21:
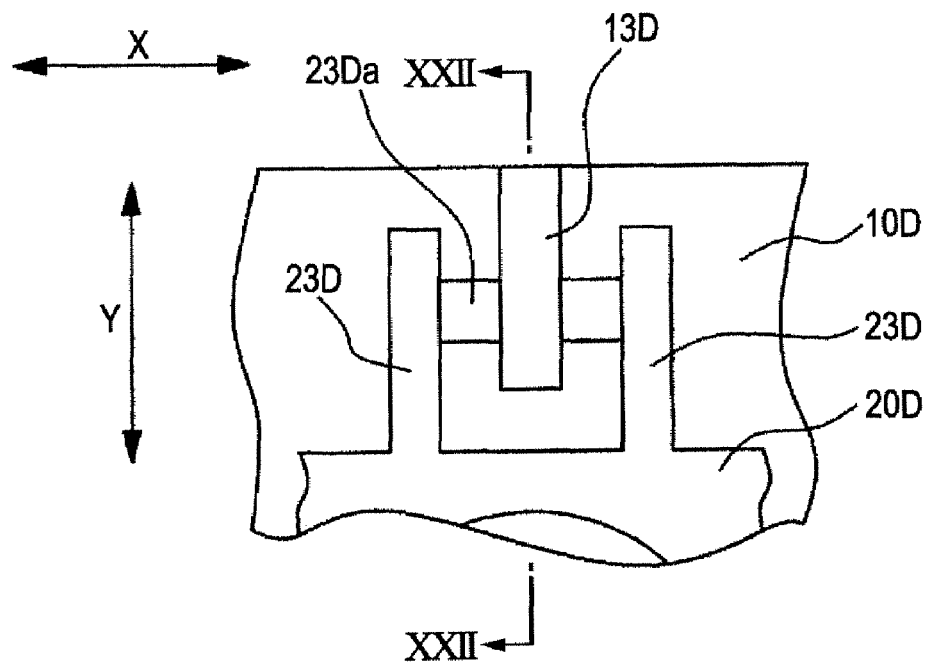
FIG. 21 illustrates a sub-guide portion according to a first modification together with FIG. 22 and, more specifically.
Figure 22:
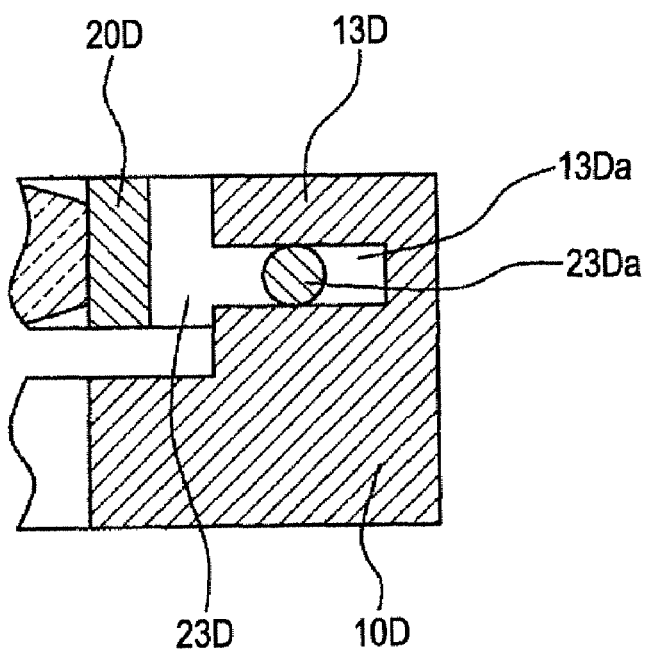
FIG. 22 is a cross-sectional view taken along a line XXII-XXII of FIG. 21.

FIGS. 21 and 22 illustrate a first modification of the sub-guide portion.

Two support arms 23D protrude from a support member 20D. A slide pin 23Da is supported by the support arms 23D such that the slide pin 23Da bridges between the two support arms 23D. The slide pin 23Da is disposed so as to extend in, for example, the X direction.

A sub-guide portion 13D protrudes from a base member 10D. A guide groove 13Da is formed in the sub-guide portion 13D so as to extend in the Y direction. The slide pin 23Da is slidably engaged with the guide groove 13Da.

Figure 23:
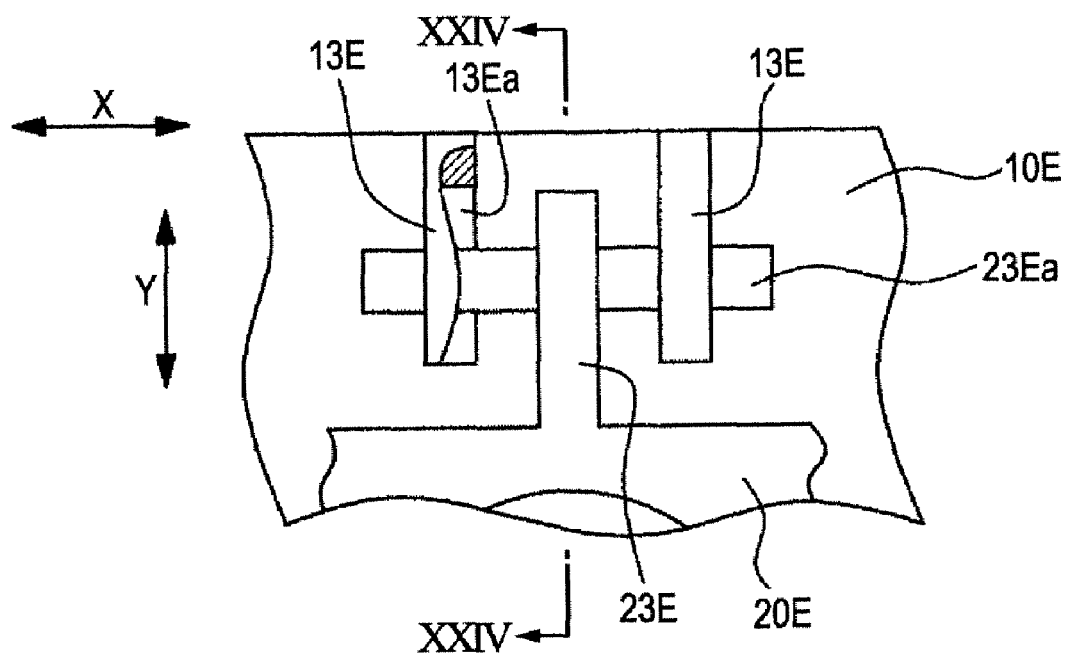
FIG. 23 illustrates a sub-guide portion according to a second modification together with FIG. 24 and, more specifically.
Figure 24:
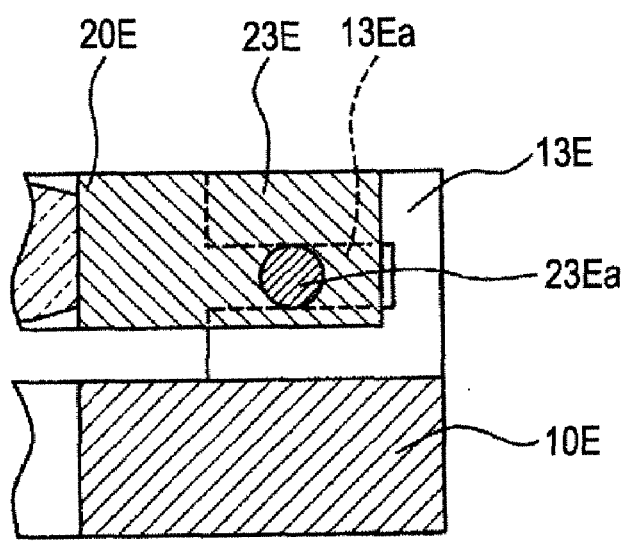
FIG. 24 is a cross-sectional view taken along a line XXIV-XXIV of FIG. 23.

FIGS. 23 and 24 illustrate a second modification of the sub-guide portion.

A support arm 23E protrudes from a support member 20E. The middle portion of a slide pin 23Ea is secured to the support arm 23E. Accordingly, either end of the slide pin 23Ea protrudes from both sides of the support arm 23E. The slide pin 23Ea is disposed so as to extend in, for example, the X direction.

Two sub-guide portions 13E are provided on a base member 10E with a spacing therebetween, for example, in the X direction. A guide groove 13Ea is formed in each of the sub-guide portions 13E so as to extend in, for example, the Y direction. The slide pin 23Ea is slidably engaged with the guide grooves 13Ea.

Figure 25:
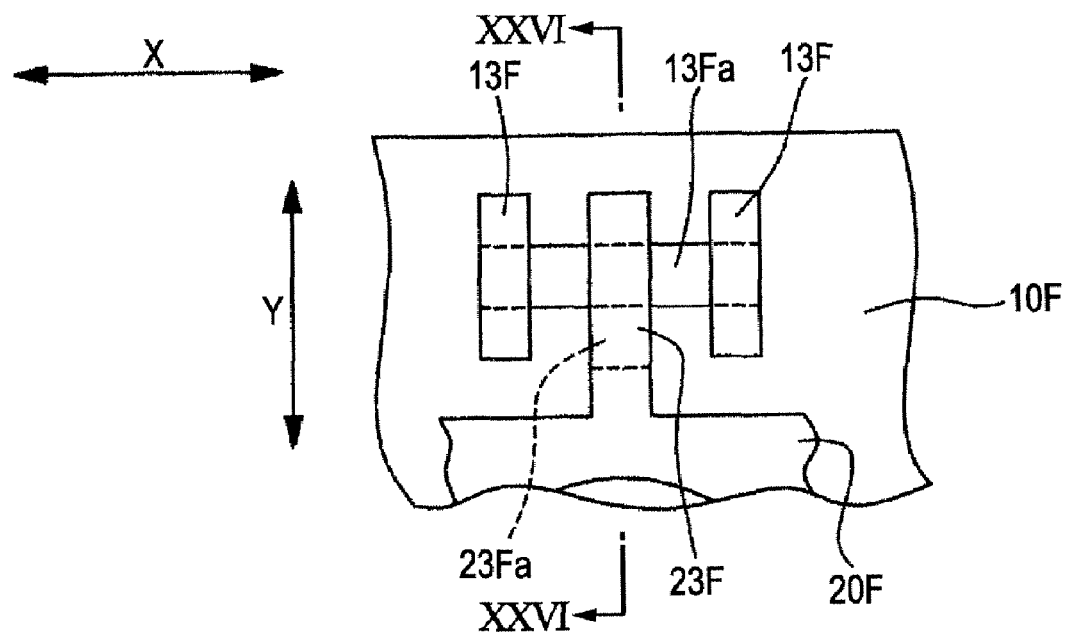
FIG. 25 illustrates a sub-guide portion according to a third modification together with FIG. 26 and, more specifically.
Figure 26:
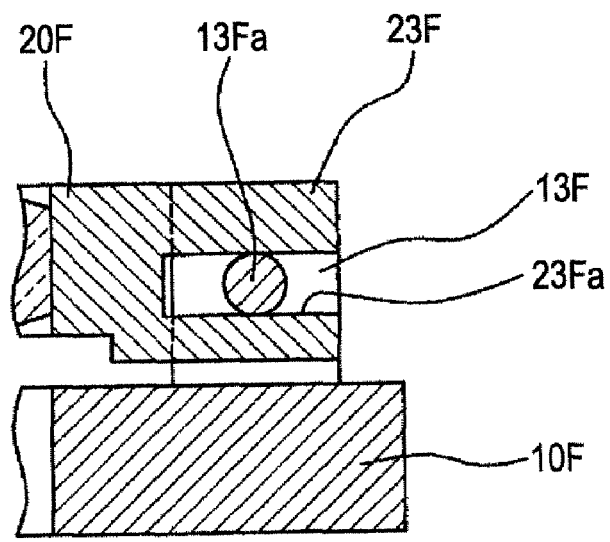
FIG. 26 is a cross-sectional view taken along a line XXVI-XXVI of FIG. 25.

FIGS. 25 and 26 illustrate a third modification of the sub-guide portion.

A support arm 23F protrudes from a support member 20F. A guide groove 23Fa is formed in the support arm 23F so as to extend in the Y direction.

A base member 10F has two support projections 13F protruding therefrom and being spaced apart in the X direction. The support projections 13F support either end of a slide pin 13Fa such that the slide pin 13Fa bridges between the support projections 13F. The slide pin 13Fa is slidably engaged with the guide groove 23Fa of the support member 20F.

Figure 27:
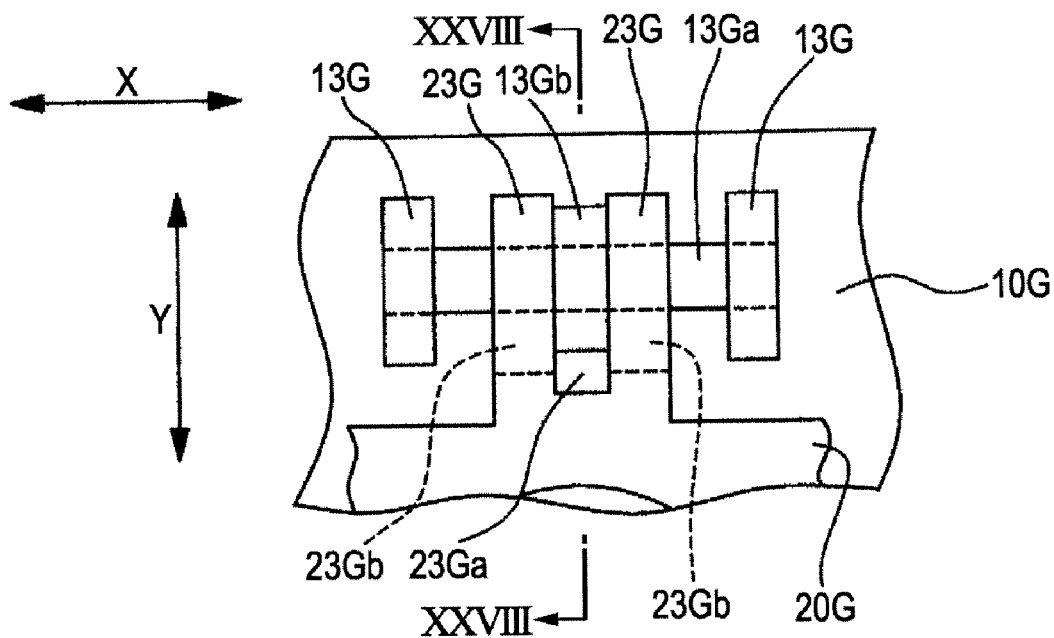
FIG. 27 illustrates a sub-guide portion according to a fourth modification together with FIG. 28 and, more specifically.
Figure 28:
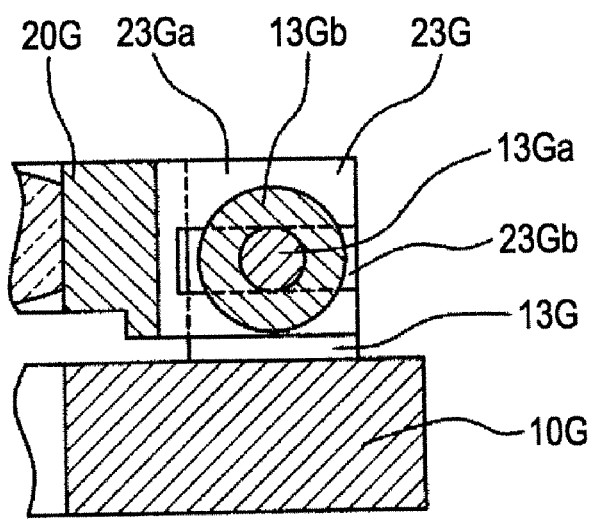
FIG. 28 is a cross-sectional view taken along a line XXVIII-XXVIII of FIG. 27.

FIGS. 27 and 28 illustrate a fourth modification of the sub-guide portion.

Two support projections 23G protrude from a support member 20G so as to be spaced apart in the Y direction and so as to be parallel to each other. A slide groove 23Ga is formed between the two support projections 23G so as to extend in the Y direction. In addition, a guide groove 23Gb is formed in each of the support projections 23G.

In contrast, two support projections 13G protrude from a base member 10G so as to be spaced apart in the X direction. A guide shaft 13Ga is supported by the two support projections 13G so as to bride between the two support projections 13G and so as to extend in the X direction. The guide shaft 13Ga is slidably engaged with the two guide grooves 23Gb.

In addition, a slide member 13Gb having a relatively thick disc shape is fitted into the guide shaft 13Ga in a slidable manner in the axis direction of the guide shaft 13Ga, that is, in the X direction. Furthermore, the slide member 13Gb is engaged with the slide groove 23Ga in a slidable manner in the Y direction.

Accordingly, when the support member 20G is moved in the X direction, the two guide grooves 23Gb of the support member 20G slide along the guide shaft 13Ga of the base member 10G in the X direction. Thus, the slide member 13Gb slides along the guide shaft 13Ga in the X direction together with the support member 20G. In addition, when the support member 20G is moved in the Y direction, the two guide grooves 23Gb of the support member 20G slide along the guide shaft 13Ga of the base member 10G in the Y direction. Thus, the slide grooves 23Ga of the support member 20G slide along the slide member 13Gb in the Y direction.

As noted above, the guide grooves 23Gb are engaged with the guide shaft 13Ga such that the guide grooves 23Gb can slide with respect to the guide shaft 13Ga in both X and Y directions. However, the slide member 13Gb is engaged with the slide groove 23Ga such that the slide member 13Gb can move with respect to the slide groove 23Ga only in the Y direction. Accordingly, the sub-guide portion prevents rolling of the support member 20G as well. That is, two mechanisms that prevent rolling of the support member 20G are provided. As a result, rolling of the support member 20G is further reliably prevented.

Figure 29:
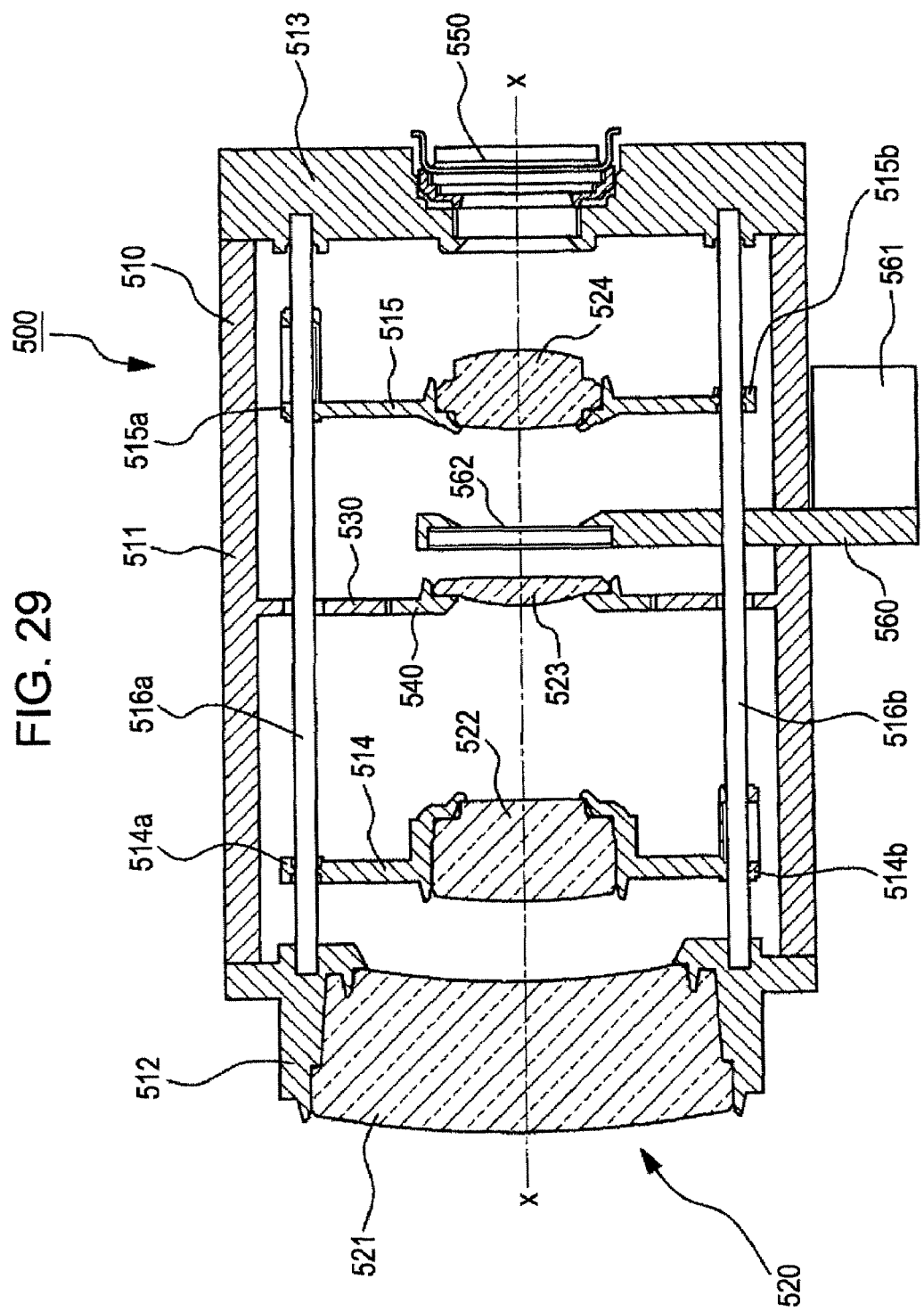
FIG. 29 is a longitudinal cross-sectional view of an exemplary lens barrel.

FIG. 29 illustrates an example of a lens barrel including one of the image stabilization mechanisms according to the exemplary embodiments of the present invention.

A lens barrel 500 has an outer shell 510. The outer shell 510 includes a substantially cylindrical shaped main cylinder 511, a front frame 512 attached to the front end of the main cylinder 511, and a rear frame 513 attached to the rear end of the main cylinder 511.

The outer shell 510 supports first to fourth lens groups 521, 522, 523, and 524 that form a four-group image-capturing zoom lens 520. That is, the first lens group 521 is supported by the front frame 512. The second lens group 522 and the fourth lens group 524 are supported by movable lens frames 514 and 515, respectively. The movable lens frame 514 includes support arms 514a and 514b, and the movable lens frame 515 includes support arms 515a and 515b. The support arms 514a and 515a are slidably supported by a first guide shaft 516a that is supported by the outer shell 510 and that extends in a direction of a light axis x inside the outer shell 510. In addition, the support arms 514b and 515b are slidably supported by a second guide shaft 516b supported by the outer shell 510 and that extends in the direction of the light axis x inside the outer shell 510. The movable lens frames 514 and 515 are moved along the first and second guide shafts 516a and 516b in the light axis direction using lens drive mechanisms (not shown), respectively. When the second lens group 522 supported by the movable lens frame 514 is moved in the direction of the light axis x, the second lens group 522 provides, for example, a zoom function. In addition, when the fourth lens group 524 supported by the movable lens frame 515 is moved in the direction of the light axis x, the fourth lens group 524 provides, for example, a function of compensating for the variation in the position of an imaging plane caused by the movement of the second lens group 522.

The third lens group 523 is stationary in the direction of the light axis x, but is movable in a direction perpendicular to the light axis x so as to move the imaging position in the direction perpendicular to the light axis x. That is, the third lens group 523 serves as a compensation lens (lens group) having an image stabilization function. The third lens group 523 is supported by a support member 540. The support member 540 is movable relative to a base member 530 secured to the main cylinder 511 in two directions that are perpendicular to the light axis x and that are perpendicular to each other. That is, the above-described image stabilization mechanisms 100, 200, 300, or 400, or the above-described image stabilization mechanism other than these image stabilization mechanism can be applied to a mechanism for supporting the third lens group 523. In FIG. 29, for simplicity, only the base member 530 and the support member 540 are shown as an image stabilization mechanism.

Note that each of the lens groups 521, 522, 523, and 524 includes a single lens or a plurality of lenses. However, for simplicity, even when the lens group includes a plurality of lenses, the drawing is simplified so that a solid core is illustrated between the surface on the object side and the surface on the image plane side.

The rear frame 513 supports, for example, an image sensor 550, such as a charge coupled device (CCD) sensor or a complementary metal-oxide semiconductor (CMOS) sensor. The image sensor 550 converts an optical image formed through the image-capturing lens 520 into an electrical signal.

An iris mechanism 560 is disposed in the vicinity of the third lens group 523. The iris mechanism 560 includes a plurality of blades 562 (not shown in detail in FIG. 29) that are driven by an iris motor 561. The blades 562 are driven so that an amount of light made incident on the image sensor 550 is controlled.

While the above-described exemplary embodiments have been described with reference to a mechanism in which some of lenses are moved in the direction perpendicular to the light axis, the image sensor may be moved in the direction perpendicular to the light axis in place of the lenses.

Furthermore, while the above-described exemplary embodiments have been described with reference to the lens barrel 500 fixed to the body of a camera (e.g., a compact camera), the application is not limited thereto. For example, the image sensor 550 may be removed from the lens barrel 500. In addition, a structure (e.g., a combination of a screw portion for insertion and a rotation rock mechanism) that allows the lens barrel 500 to be removably attached to the camera body may be provided on the rear end of the outer shell 510. When the lens barrel 500 is attached to the camera body, an image is formed on an image sensor disposed inside the camera body. In this way, the lens barrel 500 can be used for an interchangeable lens of single-lens reflex cameras. In such a case, even when the camera body does not include an image stabilization mechanism (i.e., a mechanism for mechanically moving the image sensor or electrically moving the position of a formed image), image capturing using an image stabilization function can be performed by mounting the interchangeable lens according to an embodiment of the present invention.

An image pickup apparatus according to an exemplary embodiment of the present invention is described next.

According to the present exemplary embodiment, an image pickup apparatus includes an image capturing lens, an image sensor for converting an optical image formed through the image capturing lens into an electrical signal, and an image stabilization mechanism for moving a movable lens or an image sensor provided in the image capturing lens in first and second directions perpendicular to the light axis of the movable lens and the incident light axis of the image sensor. One of the image stabilization mechanisms according the above-described exemplary embodiments is used for this image stabilization mechanism.

Figure 30:
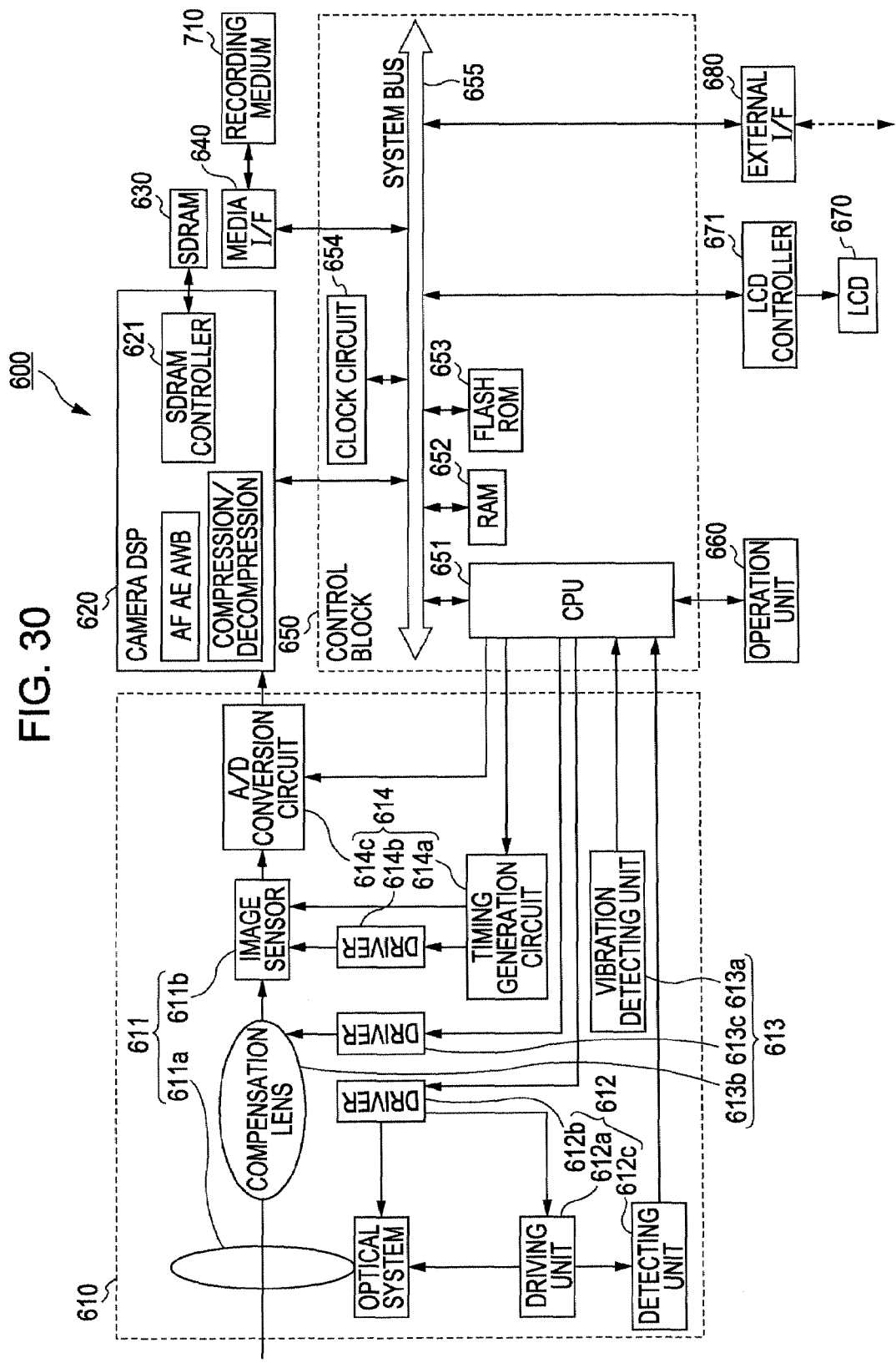
FIG. 30 is a block diagram of an image pickup apparatus according to an exemplary embodiment of the present invention.

FIG. 30 illustrates an image pickup apparatus according to the exemplary embodiment of the present invention.

An image pickup apparatus 600 includes a camera block 610, a camera digital signal processor (camera DSP) 620, a synchronous dynamic random access memory (SDRAM) 630, a media interface (media I/F) 640, a control block 650, an operation unit 660, a liquid crystal display (LCD) 670, and an external interface 680. In addition, a recording medium 710 is removably mounted in the image pickup apparatus 600.

Examples of the recording medium 710 include a memory card using a semiconductor memory and a variety of disc recording media, such as recordable DVDs (digital versatile disks) and recordable CDs (compact discs).

The camera block 610 includes an image capturing unit 611, a lens driving system 612, an image stabilization system 613, and an image retrieving system 614.

The image capturing unit 611 includes an image capturing lens 611a for capturing an optical image and an image sensor 611b for converting the obtained optical image into an electrical signal.

The lens driving system 612 drives the movable lens in the image capturing lens 611a so as to perform zooming and focusing. The lens driving system 612 includes a driving unit 612a, such as a stepping motor, for driving the movable lens, a driver 612b for controlling the driving unit 612a, and a detecting unit 612c for feeding back the operation of the driving unit 612a.

The image stabilization system 613 detects camera shake (vibration). For example, the image stabilization system 613 includes a vibration detecting unit 613a, such as a gyro sensor, and a driver 613c for moving a compensation lens 613b included in the image capturing lens 611a by a predetermined distance in a predetermined direction on the basis of the detection result of the vibration detecting unit 613a.

The image retrieving system 614 includes a timing generation circuit 614a for generating a driving timing of the image sensor 611b under the control of the control block 650, a driver 614b for driving the image sensor 611b using the timing generated by the timing generation circuit 614a, and an analog-to-digital (A/D) conversion circuit 614c for converting an analog signal retrieved from the image sensor 611b to a digital signal. The A/D conversion circuit 614c performs a correlated double sampling (CDS) process on image information (i.e., an input electrical signal) so as to maintain an excellent S/N ratio. In addition, the A/D conversion circuit 614c performs an automatic gain control (AGC) process on the image information. Thereafter, the A/D conversion circuit 614c performs an A/D conversion process so as to generate image data in the form of a digital signal.

The camera DSP 620 performs signal processing, such as an auto focus (AF) process, an auto exposure (AE) process, and an auto white balance (AWB) process, on the image data input from the A/D conversion circuit 614c. The image data subjected to the AF, AE, and AWB processes is compressed in a predetermined manner. Subsequently, the image data is output onto the recording medium 710 via the control block 650. Thus, the image data is recorded on the recording medium 710 as a file.

The camera DSP 620 includes an SDRAM controller 621. In the camera DSP 620, data are read out from or written to the SDRAM 630 at high speed under the control of the SDRAM controller 621.

The control block 650 is composed of a microcomputer having a central processing unit (CPU) 651, a random access memory (RAM) 652, a flash read only memory (flash ROM) 653, and a clock circuit 654, which are connected to each other via a system bus 655. The control block 650 controls the components of the image pickup apparatus 600.

The CPU 651 transmits an instruction signal to the drivers 612b and 613c and transmits an instruction signal to the driver 614b via the timing generation circuit 614a so as to control these drivers.

The RAM 652 temporarily stores the intermediate results of the processes. The RAM 652 is primarily used as a work area.

The flash ROM 653 stores a variety of programs executed by the CPU 651 and data required for a variety of processing.

The clock circuit 654 outputs the current date and time, the current day of the week, and the date and time of a captured image.

The operation unit 660 includes a touch panel and control keys provided on the casing of the image pickup apparatus 600. A signal generated in accordance with the operation through the operation unit 660 is input to the CPU 651, which outputs instruction signals to the components of the image pickup apparatus 600 on the basis of the signals input to the CPU 651.

The LCD 670 is provided, for example, on the casing of the image pickup apparatus 600. The LCD 670 is controlled by an LCD controller 671 connected to the system bus 655. The LCD 670 displays a variety of information, such as image data, in accordance with a driving signal output from the LCD controller 671.

The external interface (external I/F) 680 is connected to the system bus 655. The external interface 680 allows the image pickup apparatus 600 to be connected to an external apparatus, for example, an external personal computer. The image pickup apparatus 600 can receive image data from the personal computer and record the received image data on the recording medium 710. In addition, the image pickup apparatus 600 can output image data recorded on the recording medium 710 to the external personal computer. Note that the recording medium 710 is connected to the control block 650 via the media interface 640 connected to the system bus 655.

In addition, by connecting an external device (e.g., a communication module) to the external interface 680, the image pickup apparatus 600 can be connected to a network, such as the Internet. Thus, the image pickup apparatus 600 can receive a variety of image data and additional information via the network. The image pickup apparatus 600 can record the received data and information onto the recording medium 710 or transfer data recorded on the recording medium 710 to a desired receiver in the network. The external interface 680 may be a wired interface, such as an IEEE (institute of electrical and electronics engineers) 1394 interface or a USB (universal serial bus) interface. Alternatively, the external interface 680 may be a wireless interface using light or radio waves.

The image data recorded on the recording medium 710 is read out in response to an instruction signal in accordance with the operation performed by a user through the operation unit 660. The readout image data is sent to the camera DSP 620 via the media interface 640.

The camera DSP 620 reads out the compressed image data from the recording medium 710 so as to perform a decompression process (an expansion process) on the readout compressed image data. Subsequently, the camera DSP 620 transmits the decompressed image data to the LCD controller 671 via the system bus 655. The LCD controller 671 outputs an image signal in accordance with the received image data. As a result, an image is displayed on the LCD 670 on the basis of the image signal.

As a commercial product, the image pickup apparatus 600 can take a variety of forms. For example, the image pickup apparatus 600 can be widely applied to digital input/output apparatuses, such as digital still cameras, digital video cameras, cell phones having a built-in camera, and personal digital assistants (PDAs) having a built-in camera, in the form of a camera unit.

It should be understood by those skilled in the art that various modifications, combinations, sub-combinations and alterations may occur depending on design requirements and other factors insofar as they are within the scope of the appended claims or the equivalents thereof.

What is claimed is:

1. An image stabilization mechanism for moving one of a movable lens and an image sensor in first and second directions perpendicular to one of a light axis of the movable lens and an incident light axis of the image sensor, comprising:
   a support member for supporting one of the movable lens and the image sensor;
   a base member;
   a guide shaft secured to the base member and extending in the first direction, the guide shaft passing through an elongate hole formed in the support member and being disposed in the elongate hole in a slidable manner in the first and second directions;
   an anti-rolling member fitted into the guide shaft in a slidable manner in an axis direction of the guide shaft, the anti-rolling member being engaged with the support member in a slidable manner in the second direction that is perpendicular to the first direction so as to prevent rolling of the support member about one of the light axis and the incident light axis; and
   two driving units configured to move the support member independently in the first direction and the second direction.

2. The image stabilization mechanism according to claim 1, wherein at least part of the anti-rolling member is disposed between two guide surfaces formed in the support member so as to extend parallel to each other in the second direction, and wherein a contact protrusion that contacts the guide surfaces is formed on the at least part of the anti-rolling member.

3. The image stabilization mechanism according to claim 1, wherein the anti-rolling member has a disc shape and wherein at least part of the anti-rolling member is disposed between two guide surfaces formed in the support member so as to extend parallel to each other in the second direction.

4. The image stabilization mechanism according to claim 1, wherein the anti-rolling member is rotatable with respect to the support member.

5. An image stabilization mechanism for moving one of a movable lens and an image sensor in first and second directions perpendicular to one of a light axis of the movable lens and an incident light axis of the image sensor, comprising:
   a support member for supporting one of the movable lens and the image sensor;
   a base member;
   a guide shaft secured to the support member and extending in the first direction, the guide shaft passing through an elongate hole formed in the base member and being disposed in the elongate hole in a slidable manner in the first and second directions;
   an anti-rolling member fitted into the guide shaft in a slidable manner in an axis direction of the guide shaft, the anti-rolling member being engaged with the base member in a slidable manner in the second direction that is perpendicular to the first direction so as to prevent rolling of the support member about the light axis or the incident light axis; and
   two driving units configured to move the support member independently in the first direction and the second direction.

6. The image stabilization mechanism according to claim 5, wherein at least part of the anti-rolling member is disposed between two guide surfaces formed in the base member so as to extend parallel to each other in the second direction, and wherein a contact protrusion that contacts the guide surfaces is formed on the at least part of the anti-rolling member.

7. The image stabilization mechanism according to claim 5, wherein the anti-rolling member has a disc shape and wherein at least part of the anti-rolling member is disposed between two guide surfaces formed in the base member so as to extend parallel to each other in the second direction.

8. The image stabilization mechanism according to claim 5, wherein the anti-rolling member is rotatable with respect to the base member.

9. An image stabilization mechanism for moving one of a movable lens and an image sensor in first and second directions perpendicular to one of a light axis of the movable lens and an incident light axis of the image sensor, comprising:
   a support member for supporting one of the movable lens and the image sensor;
   a base member;
   a guide shaft supported by the base member in a slidable manner in the first direction and engaged with an elongate hole formed in the support member in a slidable manner in the second direction;
   an anti-rolling member secured to the guide shaft, the anti-rolling member being engaged with the support member in a slidable manner in the second direction so as to prevent rolling of the support member about the light axis or the incident light axis; and
   two driving units configured to move the support member independently in the first direction and the second direction.

10. The image stabilization mechanism according to claim 9, wherein at least part of the anti-rolling member is disposed between two guide surfaces formed in the support member so as to extend parallel to each other in the second direction, and wherein a contact protrusion that contacts the guide surfaces is formed on the at least part of the anti-rolling member.

11. The image stabilization mechanism according to claim 9, wherein the anti-rolling member has a disc shape and wherein at least part of the anti-rolling member is disposed between two guide surfaces formed in the support member so as to extend parallel to each other in the second direction.

12. The image stabilization mechanism according to claim 9, wherein the anti-rolling member is rotatable with respect to the support member.

13. An image stabilization mechanism for moving one of a movable lens and an image sensor in first and second directions perpendicular to one of a light axis of the movable lens and an incident light axis of the image sensor, comprising:
   a support member for supporting one of the movable lens and the image sensor;
   a base member;
   a guide shaft supported by the support member in a slidable manner in the first direction and engaged with an elongate hole formed in the base member in a slidable manner in the second direction;
   an anti-rolling member secured to the guide shaft, the anti-rolling member being engaged with the base member in a slidable manner in the second direction so as to prevent rolling of the support member about the light axis or the incident light axis; and two driving units configured to move the support member independently in the first direction and the second direction.

14. The image stabilization mechanism according to claim 13, wherein at least part of the anti-rolling member is disposed between two guide surfaces formed in the base member so as to extend parallel to each other in the second direction, and wherein a contact protrusion that contacts the guide surfaces is formed on the at least part of the anti-rolling member.

15. The image stabilization mechanism according to claim 13, wherein the anti-rolling member has a disc shape and wherein at least part of the anti-rolling member is disposed between two guide surfaces formed in the base member so as to extend parallel to each other in the second direction.

16. The image stabilization mechanism according to claim 13, wherein the anti-rolling member is rotatable with respect to the base member.

17. An image pickup apparatus comprising:
an image capturing lens;
an image sensor configured to convert an optical image formed through the image capturing lens to an electrical signal; and
an image stabilization mechanism configured to move one of a movable lens provided in the image capturing lens and the image sensor in first and second directions perpendicular to one of a light axis of the movable lens and an incident light axis of the image sensor, the image stabilization mechanism including a support member for supporting one of the movable lens and the image sensor, a base member, a guide shaft secured to the base member and extending in the first direction, the guide shaft passing through an elongate hole formed in the support member and being disposed in the elongate hole in a slidable manner in the first and second directions, an anti-rolling member fitted into the guide shaft in a slidable manner in an axis direction of the guide shaft, the anti-rolling member being engaged with the support member in a slidable manner in the second direction that is perpendicular to the first direction so as to prevent rolling of the support member about one of the light axis and the incident light axis, and two driving units configured to move the support member independently in the first direction and the second direction.

18. The image pickup apparatus according to claim 17, wherein at least part of the anti-rolling member is disposed between two guide surfaces formed in the support member so as to extend parallel to each other in the second direction, and wherein a contact protrusion that contacts the guide surfaces is formed on the at least part of the anti-rolling member.

19. The image pickup apparatus according to claim 17, wherein the anti-rolling member has a disc shape and wherein at least part of the anti-rolling member is disposed between two guide surfaces formed in the support member so as to extend parallel to each other in the second direction.

20. The image pickup apparatus according to claim 17, wherein the anti-rolling member is rotatable with respect to the support member.

21. An image pickup apparatus comprising:
an image capturing lens;
an image sensor configured to convert an optical image formed through the image capturing lens to an electrical signal; and
an image stabilization mechanism configured to move one of a movable lens provided in the image capturing lens and the image sensor in first and second directions perpendicular to one of a light axis of the movable lens and an incident light axis of the image sensor, the image stabilization mechanism including a support member for supporting one of the movable lens and the image sensor, a base member, a guide shaft secured to the support member and extending in the first direction, the guide shaft passing through an elongate hole formed in the base member and being disposed in the elongate hole in a slidable manner in the first and second directions, an anti-rolling member fitted into the guide shaft in a slidable manner in an axis direction of the guide shaft, the anti-rolling member being engaged with the base member in a slidable manner in the second direction that is perpendicular to the first direction so as to prevent rolling of the support member about one of the light axis and the incident light axis, and two driving units configured to move the support member independently in the first direction and the second direction.

22. The image pickup apparatus according to claim 21, wherein at least part of the anti-rolling member is disposed between two guide surfaces formed in the base member so as to extend parallel to each other in the second direction, and wherein a contact protrusion that contacts the guide surfaces is formed on the at least part of the anti-rolling member.

23. The image pickup apparatus according to claim 21, wherein the anti-rolling member has a disc shape and wherein at least part of the anti-rolling member is disposed between two guide surfaces formed in the base member so as to extend parallel to each other in the second direction.

24. The image pickup apparatus according to claim 21, wherein the anti-rolling member is rotatable with respect to the base member.

25. An image pickup apparatus comprising:
an image capturing lens;
an image sensor configured to convert an optical image formed through the image capturing lens to an electrical signal; and
an image stabilization mechanism configured to move one of a movable lens and an image sensor in first and second directions perpendicular to one of a light axis of the movable lens and an incident light axis of the image sensor, the image stabilization mechanism including a support member for supporting one of the movable lens and the image sensor, a base member, a guide shaft supported by the base member in a slidable manner in the first direction and engaged with an elongate hole formed in the support member in a slidable manner in the second direction, an anti-rolling member secured to the guide shaft, the anti-rolling member being engaged with the support member in a slidable manner in the second direction so as to prevent rolling of the support member about one of the light axis and the incident light axis, and two driving units configured to move the support member independently in the first direction and the second direction.

26. The image pickup apparatus according to claim 25, wherein at least part of the anti-rolling member is disposed between two guide surfaces formed in the support member so as to extend parallel to each other in the second direction, and wherein a contact protrusion that contacts the guide surfaces is formed on the at least part of the anti-rolling member.

27. The image pickup apparatus according to claim 25, wherein the anti-rolling member has a disc shape and wherein at least part of the anti-rolling member is disposed between two guide surfaces formed in the support member so as to extend parallel to each other in the second direction.

28. The image pickup apparatus according to claim 25, wherein the anti-rolling member is rotatable with respect to the support member.

29. An image pickup apparatus comprising:

an image capturing lens;

an image sensor configured to convert an optical image formed through the image capturing lens to an electrical signal; and an image stabilization mechanism configured to move one of a movable lens and an image sensor in first and second directions perpendicular to one of a light axis of the movable lens and an incident light axis of the image sensor, the image stabilization mechanism including a support member for supporting one of the movable lens and the image sensor, a base member, a guide shaft supported by the support member in a slidable manner in the first direction and engaged with an elongate hole formed in the base member in a slidable manner in the second direction, an anti-rolling member secured to the guide shaft, the anti-rolling member being engaged with the base member in a slidable manner in the second direction so as to prevent rolling of the support member about one of the light axis and the incident light axis, and two driving units configured to move the support member independently in the first direction and the second direction.

30. The image pickup apparatus according to claim 29, wherein at least part of the anti-rolling member is disposed between two guide surfaces formed in the base member so as to extend parallel to each other in the second direction, and wherein a contact protrusion that contacts the guide surfaces is formed on the at least part of the anti-rolling member.

31. The image pickup apparatus according to claim 29, wherein the anti-rolling member has a disc shape and wherein at least part of the anti-rolling member is disposed between two guide surfaces formed in the base member so as to extend parallel to each other in the second direction.

32. The image pickup apparatus according to claim 29, wherein the anti-rolling member is rotatable with respect to the base member.

* * * * *